(12) United States Patent
Brown et al.

(10) Patent No.: US 8,248,402 B2
(45) Date of Patent: Aug. 21, 2012

(54) ADAPTIVE RAY DATA REORDER FOR OPTIMIZED RAY TEMPORAL LOCALITY

(75) Inventors: Jeffrey Douglas Brown, Rochester, MN (US); Russell Dean Hoover, Rochester, MN (US); Eric Oliver Mejdrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 11/564,030

(22) Filed: Nov. 28, 2006

(65) Prior Publication Data
US 2008/0122846 A1    May 29, 2008

(51) Int. Cl.
G06T 15/00 (2006.01)
G06T 17/00 (2006.01)
G06T 15/50 (2006.01)
G06T 15/20 (2006.01)
G09G 5/00 (2006.01)

(52) U.S. Cl. ........ 345/419; 345/420; 345/421; 345/424; 345/426; 345/619

(58) Field of Classification Search .................. None
See application file for complete search history.

(56) References Cited

U.S. PATENT DOCUMENTS 7,012,604 B1 *  3/2006  Christie et al. ............... 345/426
7,164,420 B2 *  1/2007  Ard ............................... 345/423

OTHER PUBLICATIONS

Boulos et al, Interactive Distribution Ray Tracing, SCI Institute Technical Report, Jun. 1, 2006, SCI Institute, University of Utah, Salt Lake City, UT 84112, USA.*
Carr et al, The ray Engine, Graphics Hardware (2002), pp. 1-10, Eurographics Association, http://graphics.cs.uiuc.edu/~jch/papers/rt2.pdf.*
Bigler et al, Design for Parallel Interactive Ray Tracing Systems, IEEE Symposium on Interactive Ray Tracing, Sep. 18-20, 2006, Salt Lake City, UT, USA, © 2006 IEEE, pp. 187-196.*

* cited by examiner

Primary Examiner — Tize Ma
(74) Attorney, Agent, or Firm — Patterson & Sheridan, LLP

(57) ABSTRACT

According to embodiments of the invention, secondary rays may be pooled after they are generated by a vector throughput engine. After pooling the secondary rays, they may be reordered according to similarities in trajectory and originating location. The secondary rays may be sent in the new order to a workload manager for spatial index traversal. The reordering of the secondary rays may cause rays which traverse similar portions of the spatial index to be traversed immediately following (or shortly thereafter) one another. Consequently, the necessary portions of the spatial index may remain within the workload manager's memory cache, thereby reducing the number of cache misses and the amount of time necessary to traverse secondary rays through the spatial index. The reduction in time necessary to traverse the secondary rays through the spatial index may improve the overall performance of the image processing system.

19 Claims, 17 Drawing Sheets

ADAPTIVE RAY DATA REORDER FOR OPTIMIZED RAY TEMPORAL LOCALITY

BACKGROUND OF THE INVENTION

1. Field of the Invention

Embodiments of the invention generally relate to the field of image processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention a method of performing ray tracing is provided, the method generally comprising: generating a set of primary rays into a three dimensional scene; pooling secondary rays in a first order, wherein secondary rays are generated when primary rays intersect objects within the scene; reordering the secondary rays into a new order; and traversing the secondary rays through a spatial index according to the new order, wherein the spatial index has nodes representing bounding volumes in the scene.

According to another embodiment of the invention a computer readable medium is provided. The computer readable medium containing a program which, when executed, performs an operation generally comprising: generating a set of primary rays into a three dimensional scene; pooling secondary rays, wherein secondary rays are generated when primary rays intersect objects within the three dimensional scene; reordering the secondary rays into at least a first group and a second group, wherein secondary rays within the first group share similar properties; and sending the secondary rays in the first group together to a processing element for spatial index traversal, wherein a spatial index contains nodes representing bounding volumes within the three dimensional scene.

According to another embodiment of the invention a system is provided. The system generally comprising: a first processing element configured to generate primary rays into a three dimensional scene; a second processing element configured to pool secondary rays in a first order, wherein secondary rays are generated when primary rays intersect objects within the three dimensional scene; reorder the pooled secondary rays into a new order; and send the secondary rays in the new order to the first processing element; and wherein the first processing element is further configured to traverse the secondary rays through a spatial index having nodes representing bounding volumes in a three dimensional scene according to the new order.

DETAILED DESCRIPTION OF THE PREFERRED EMBODIMENTS

Figure 1:
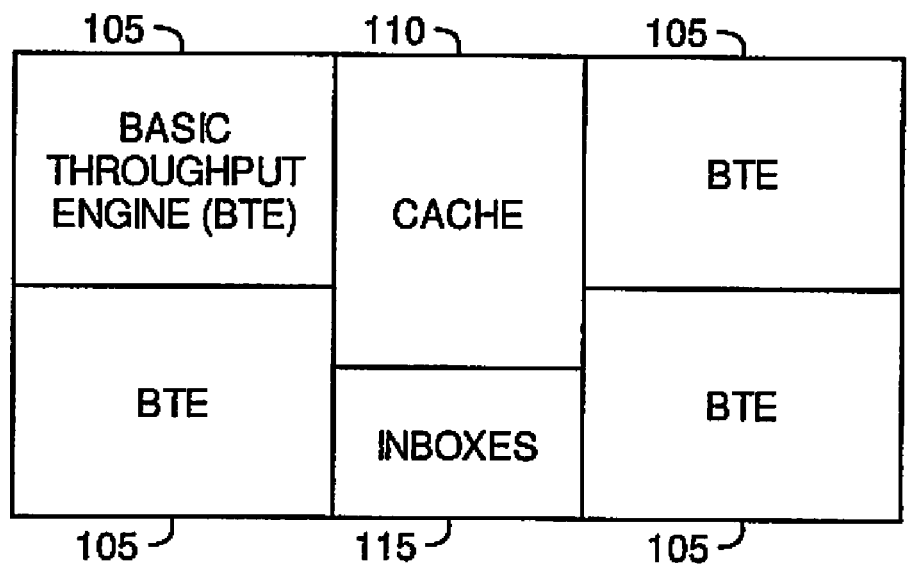
FIG. 1 is a block diagram depicting an exemplary computer processor, according to one embodiment of the invention.

According to embodiments of the invention, secondary rays may be pooled after they are generated by a vector throughput engine. After pooling the secondary rays, they may be reordered according to similarities in trajectory and originating location. The secondary rays may be sent in the new order to a workload manager for spatial index traversal. The reordering of the secondary rays may cause rays which traverse similar portions of the spatial index to be traversed immediately following (or shortly thereafter) one another. Consequently, the necessary portions of the spatial index may remain within the workload manager's memory cache, thereby reducing the number of cache misses and the amount of time necessary to traverse secondary rays through the spatial index. The reduction in time necessary to traverse the secondary rays through the spatial index may improve the overall performance of the image processing system.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the image processing system described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Multiple Core Processing Element

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element memory cache 110 (e.g., a shared L2 cache).

The BTEs 105 may also have access to a plurality of inboxes 115. The inboxes 115, described further below with regards to FIG. 3, may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low-latency and high-bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three-dimensional scene. As described further below with regards to FIG. 6, according to one embodiment of the invention, an image processing system may use a workload manager to traverse a spatial index with a ray issued by the image processing system. A spatial index, as described further below with regards to FIG. 4, may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. According to one embodiment of the invention, and described further below with regards to FIG. 6, the vector throughput engines may then determine if the ray intersects a primitive contained within the bounding volume. The vector throughput engines may also perform operations relating to determining the color of the pixel through which the ray passed.

Figure 2:
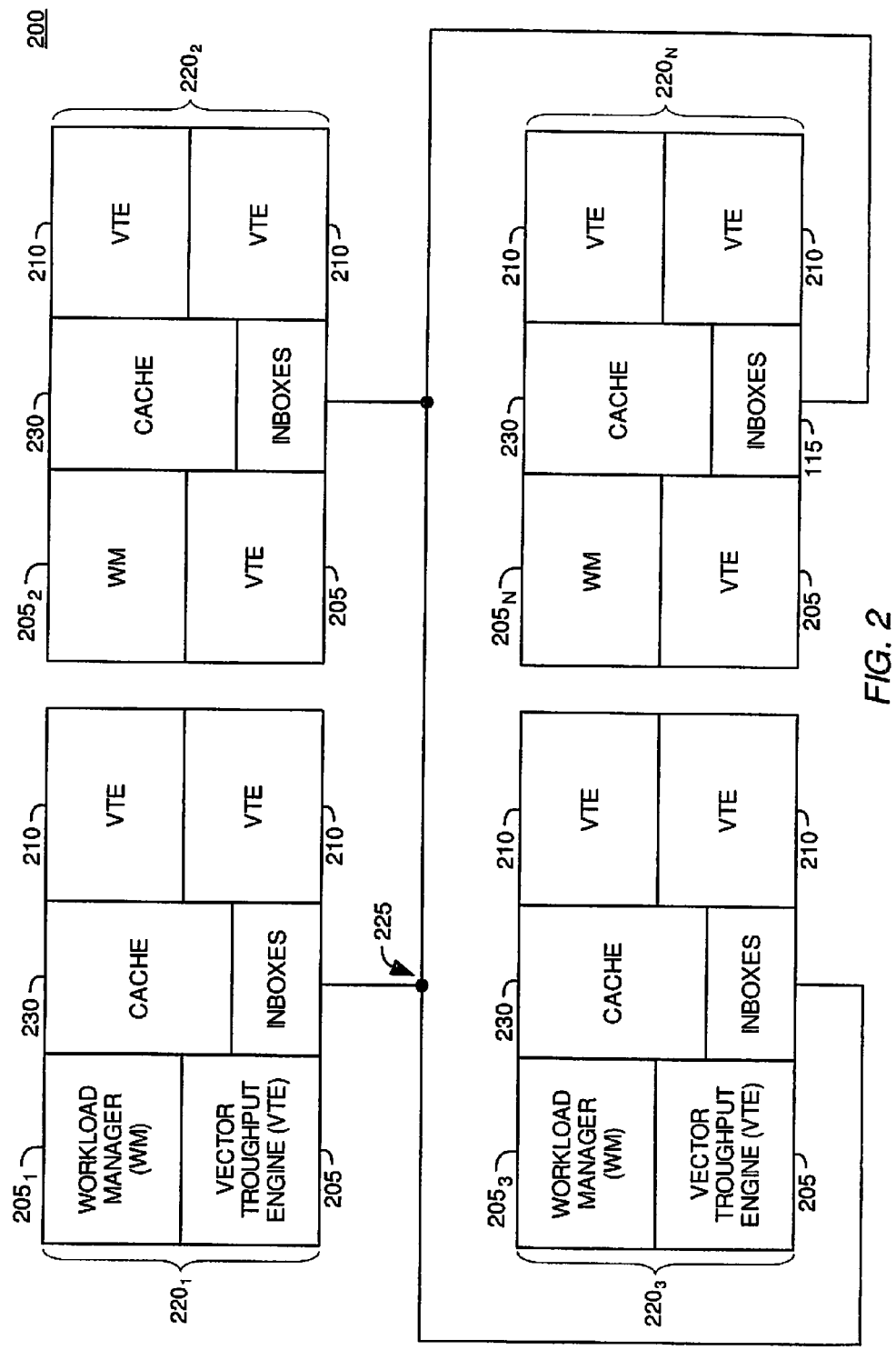
FIG. 2 illustrates a multiple core processing element network, according to one embodiment of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $220_{1-N}$ may use a high speed bus 225 to communicate with other workload managers $220_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload manager processors 205 may use the high speed bus 225 to collect and distribute image processing related tasks to other workload manager processors 205, and/or distribute tasks to other vector throughput engines 210. The use of a high speed bus 225 may allow the workload managers $205_{1-N}$ to communicate without affecting the caches 230 with data packets related to workload manager 205 communications.

Low-Latency High-Bandwidth Communications Network

As described above, the aggregate performance of an image processing system may be tied to how well the BTEs can partition and redistribute work. According to one embodiment of the invention, memory space within a cache, referred to as a memory inbox, may be used to distribute work to a single processor thread. In an image processing system using a plurality of processors each having a plurality of threads, the collection of inboxes together may be referred to as a low-latency high-bandwidth communications network.

In multithreading processor such as a BTE 105, a memory inbox may be assigned to a given thread (referred to herein as the owner thread). In one embodiment of the invention, the memory space for the inbox may be allocated from the shared memory cache 110 exclusively to the owner thread. By exclusively assigning the memory space in a cache to the owner thread, the owner thread may maintain enough memory space to cache its own instructions and data without other having other competing threads displace the owner thread's instructions and data. Thus, the memory inbox may improve execution of the owner thread by maintaining the owner thread's data and instructions in the assigned inbox portion of the cache and reducing the possibility of stalling the owner thread while data and instructions for the owner thread are retrieved from higher levels of memory. Furthermore, by assigning the memory space in a cache to the owner thread, data or instructions intended for the targeted thread may be stored only in an inbox allocated to the thread. Thus, data or instructions intended for the targeted thread are not stored throughout the shared memory cache 110, rather only in the inbox allocated to the targeted thread.

Furthermore, the inbox memory may be used by other threads to efficiently communicate with the owner thread. For example, where another thread has data and/or instructions which are to be provided to the owner thread for an inbox, the other thread may send the data and/or instructions to the inbox where the data and/or instructions may be retrieved by the owner thread. Similarly, in some cases, the owner thread may use the inbox as an outbox to communicate information with other threads. For example, to communicate the information with another thread, the owner thread may place the information in the inbox and send a notification to the other thread indicating the location of the data and/or instructions, thereby allowing the other thread to retrieve the information. Optionally, the owner thread may provide the information directly to the inbox of the other thread. Thus, the inbox memory may be used to simplify communication between a sending and a receiving thread while preventing displacement of data and/or instructions being used by other threads.

Figure 3A:
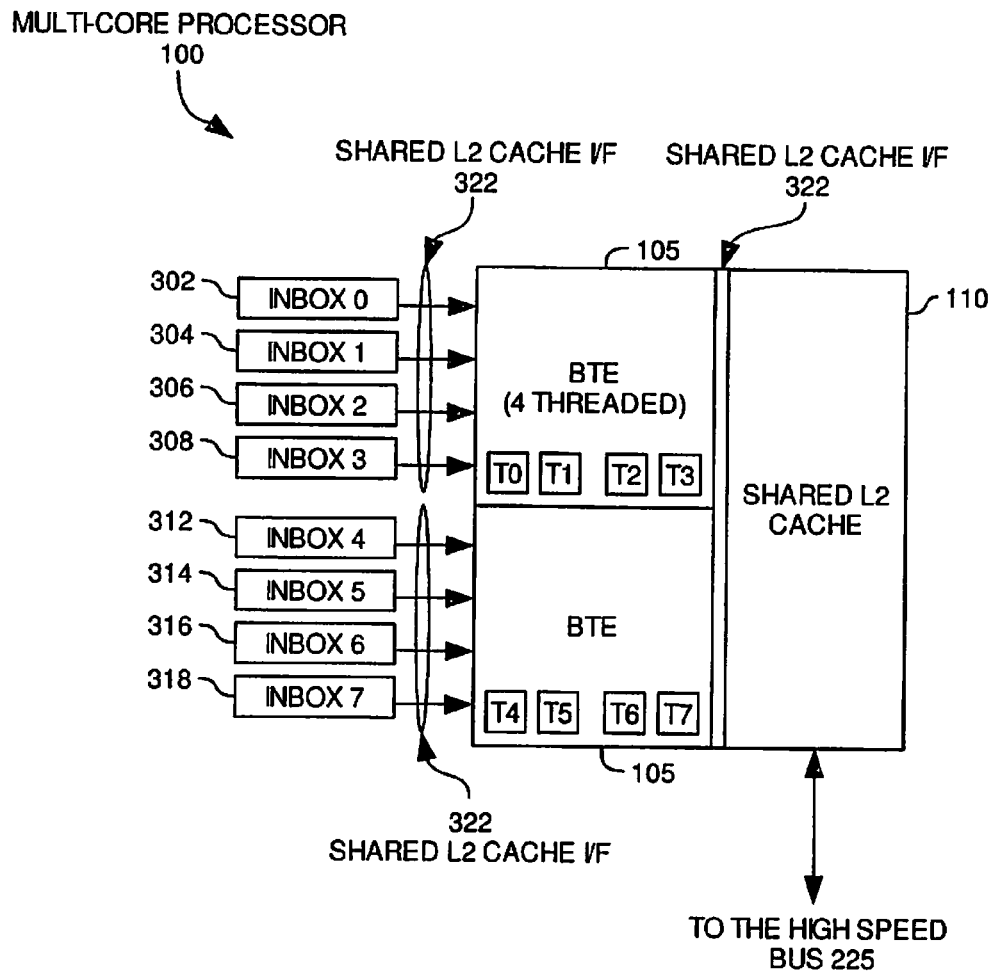
FIGS. 3A-3C are block diagrams illustrating aspects of memory inboxes according to one embodiments of the invention.

FIG. 3A is a block diagram of memory inboxes 302 . . . 318 in a multi-core processor element 100 according to one embodiment of the invention. The depiction of the memory inboxes 302 . . . 318 is intended to be a conceptual view and therefore is not limited to any particular physical configuration. As depicted, threads (e.g., threads T0-T7) executing in each core (e.g., the BTEs 105) may have access to the shared L2 cache 110 via a shared L2 cache interface 322. Furthermore, the L2 cache interface 322 may also be used by the threads T0 . . . T7 to access the corresponding memory inboxes 302 . . . 318. As described above, in some cases, each inbox 302 . . . 318 may be assigned to a corresponding thread T0-T7. Thus, Inbox 0 302 may be assigned to thread T0 and so on. As described below, by assigning a given inbox to a given thread, access to the assigned inbox may be unrestricted with respect to the owner thread while access by other threads may be restricted. Exemplary restrictions are described below in greater detail.

Figure 3B:
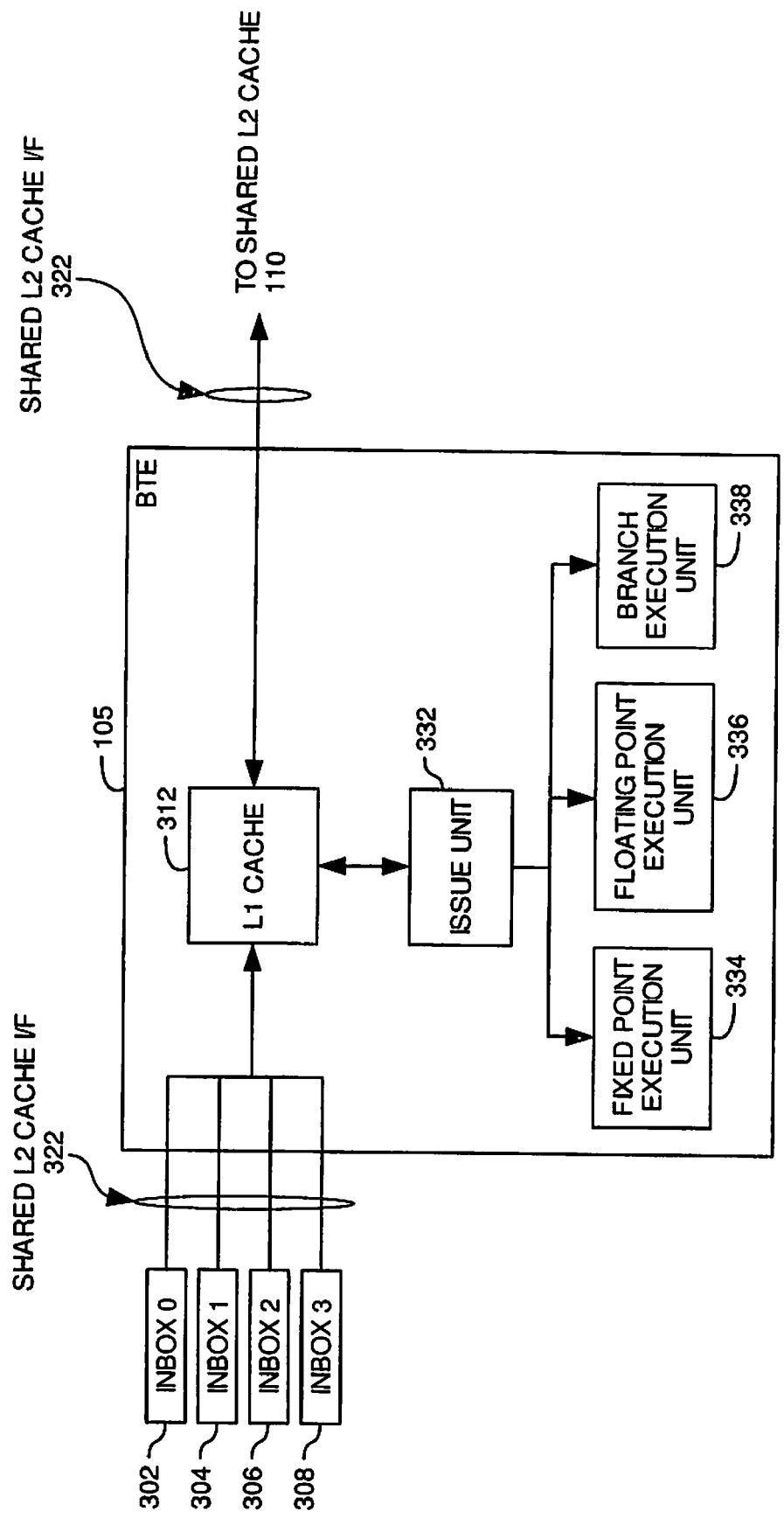

FIG. 3B is a block diagram depicting the path of data from memory inboxes (e.g., inboxes 302 . . . 308) and the shared L2 cache 110 transmitted to and from a processing core (e.g., BTE 105). As described above, both the memory inboxes 302 . . . 308 and the shared L2 cache 110 may be accessed via the shared L2 cache interface 322. Where a thread being executed in the BTE 105 retrieves data from an inbox 302 . . . 308 or from the shared L2 cache 110, the retrieved data may be placed in the L1 cache 312 for the BTE 105. Instructions for the thread may be issued from an issue unit 332. In some cases, the BTE 105 may be configured to execute multiple threads concurrently. Thus, the issue unit 332 may be configured to issue instructions for multiple threads. In some cases, the BTE 105 may provide multiple execution units 334 . . . 338 which may be used to concurrently execute threads in the BTE 105. The execution units 334 . . . 338 may include a fixed point execution unit 334, a floating point execution unit 336, and a branch execution unit 338.

In some cases, a thread may update or produce data which is to be accessed later (e.g., by the same thread or by another thread). Where the updated data is to be accessed later, the thread may place the updated data in an L1 cache 312. Furthermore, where desired, the updated data may also be placed in the L2 cache 110 or in an inbox 302 . . . 308 for the updating thread via the shared L2 cache interface 322. In some cases, as described above, direct access to a given inbox (e.g., inbox 0 302) via the shared L2 cache interface 322 may be limited to the thread (e.g., thread T0) which owns the given inbox.

In one embodiment of the invention, memory space within a memory inbox may be mapped to a global memory address (e.g., all levels of memory including the L1 cache 312, L2 cache 110, and main memory as well as all threads may use the same global memory address to access a given memory inbox). Thus, in one embodiment of the invention, to access the inbox memory space, the owner thread may merely read or write the desired information to a global memory address corresponding to the inbox memory space. A thread which does not own the memory inbox and which attempts to directly access the inbox via the global memory address, may have access to the inbox denied. Other forms of access may instead be provided to other non-owning threads, e.g., via packetized messages sent to the inbox.

Also, in one embodiment of the invention, information being stored in a memory inbox may not be cacheable. For example, while information in the L1 cache 312, L2 cache 110, and other memory level may be automatically cached by the multi core processing element 100 such that information requested from a given memory address may be automatically fetched from main memory and maintained in one of the cache levels 312, 110 while being accessed. In contrast, the globally addressable memory in a given inbox may only be located in the inbox and may not be moved between different levels of the memory hierarchy (e.g., the main memory, the shared L2 cache memory 110, or the L1 cache memory) without being copied to a new address space outside of the inbox. Thus, accesses to an inbox by an owner thread may be performed quickly and directly to the inbox memory without waiting for information to be fetched from another level of the memory hierarchy and/or translated during fetching. The non-cacheability of inbox memory may also apply with respect to packetized access of the inbox described below. Furthermore, in an alternate embodiment of the invention, information stored in the inbox may be cached in other levels of the memory hierarchy.

Assignment of Memory Inboxes

Figure 3C:
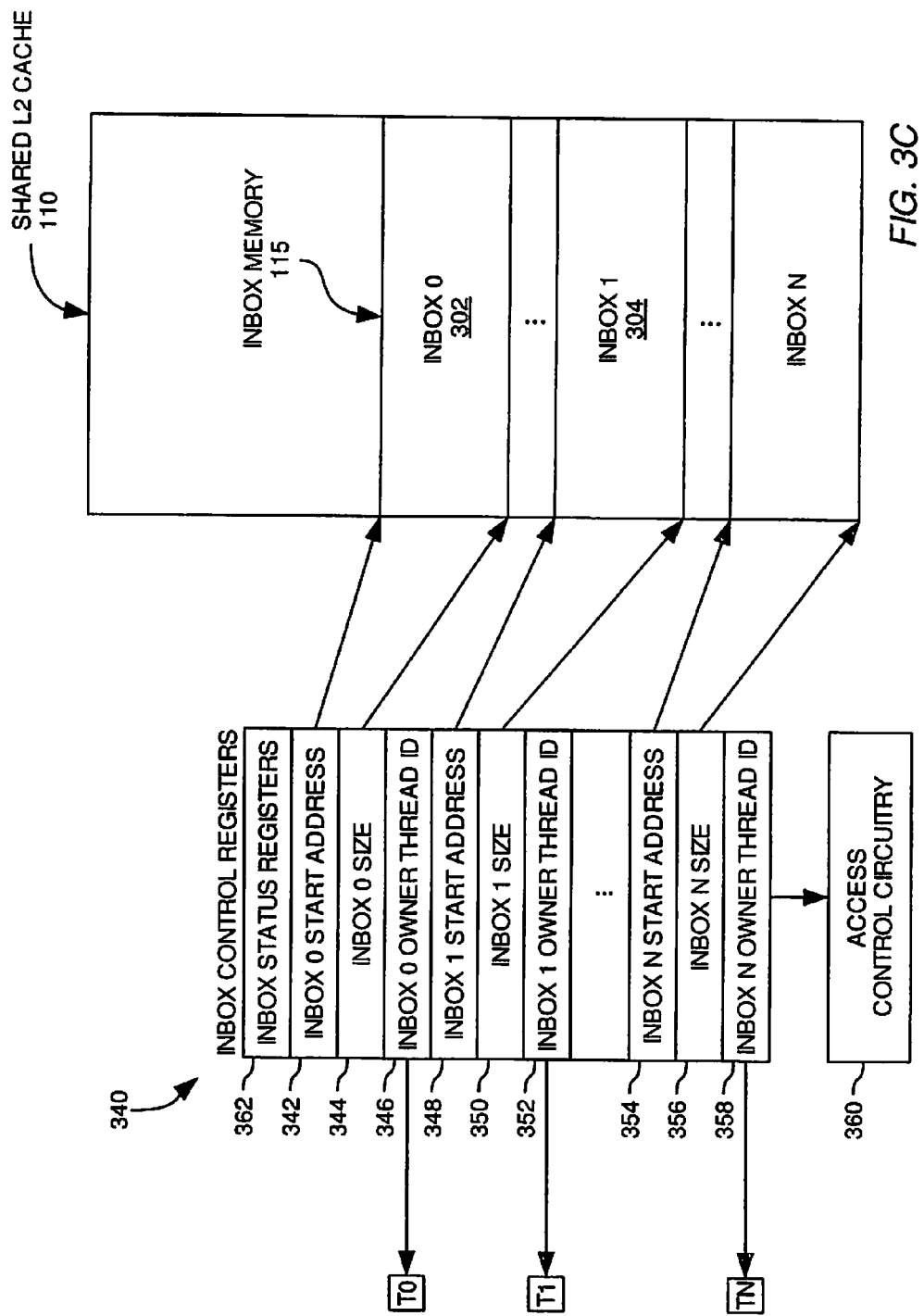

In one embodiment of the invention, memory inboxes may be provided from the shared memory cache 110 (e.g., a portion of the L2 cache 110 may be reserved for the inbox memory 115). FIG. 3C is a block diagram depicting inbox memory 115 partitioned from the shared L2 cache 110 according to one embodiment of the invention.

As depicted, the size and location of each inbox 302, 304, etc. may be controlled by inbox control registers 340. The status of each inbox 302, 304, etc. (e.g., enabled or disabled) may be indicated and/or modified via inbox status registers 362. In one embodiment, access to the inbox control registers 340 may be unrestricted. Optionally, in some cases, access to the inbox control registers may be limited, for example, to a subset of approved threads (e.g., the owner thread, a parent of the owner thread, a specially designated control thread, and/or an operating system kernel thread). In one embodiment, the inbox control registers 340 may include a start address register 342, 348 . . . 354, a size register 344, 350 . . . 356, and an owner thread identification register 346, 352 . . . 358.

In one embodiment, the start address registers 342, 348 . . . 354 may indicate a start address for each inbox 302, 304, etc. The size registers 344, 350 . . . 358 may indicate the size of a corresponding inbox 302, 304, etc. The memory space for an inbox may thus occupy each address beginning from the corresponding start address and ranging through the indicated size of the inbox. The size may be indicated in any manner, for example, as an absolute size in bytes or as an integer multiple of a fixed size (e.g., the size in the size registers 344, 350 . . . 358 may indicate the size in kilobytes).

In one embodiment, the owner thread identification register 346, 352 . . . 358 may identify which thread (e.g., thread T0, T1 . . . TN) owns a given inbox 302, 304, etc. While depicted with respect to threads and corresponding inboxes 1, 2 . . . N, embodiment of the invention may be used with any type of thread and/or inbox identifier (e.g., a number, an address, etc.). In one embodiment of the invention, the inbox identifier register may be used to restrict direct access to memory addresses within the corresponding inbox to the owner thread. In some cases, direct access may also be allowed by a limited selection of other threads, such as, for example, a parent thread of the owner thread, a specified control thread, and/or an operating system kernel thread. In one embodiment, access control circuitry 360 may be used to provide the restricted access.

By assigning portions of the shared memory cache 110 to the inboxes a low-latency high-bandwidth communications network may be formed. The remaining portion of the shared memory cache 110 may remain unassigned and, thus, available to store information which does not relate to communications between processing threads. The remaining portion of the shared memory cache 110 may be used to store geometry and data structures which are used by the image processing system to perform ray tracing (described further below with respect to FIG. 5).

A benefit of using only the inboxes for communications between processing threads and using the remaining portion of the shared memory cache 110 to store geometry and data structures is that no matter how much communications related information is passed through the inboxes, it will not consume the entire memory cache. Thus, as will be described further below, communications related information will not displace the geometry and data structures stored within the remaining portion of the shared memory cache 100. Therefore, data which is likely to be reused when tracing subsequent rays or rendering subsequent frames (object geometry and data structures) may remain in the cache, while data which is unlikely to be reused when tracing subsequent rays or rendering subsequent frames (data processing work) will not remain in the cache.

An Exemplary Three-Dimensional Scene

Figure 4:
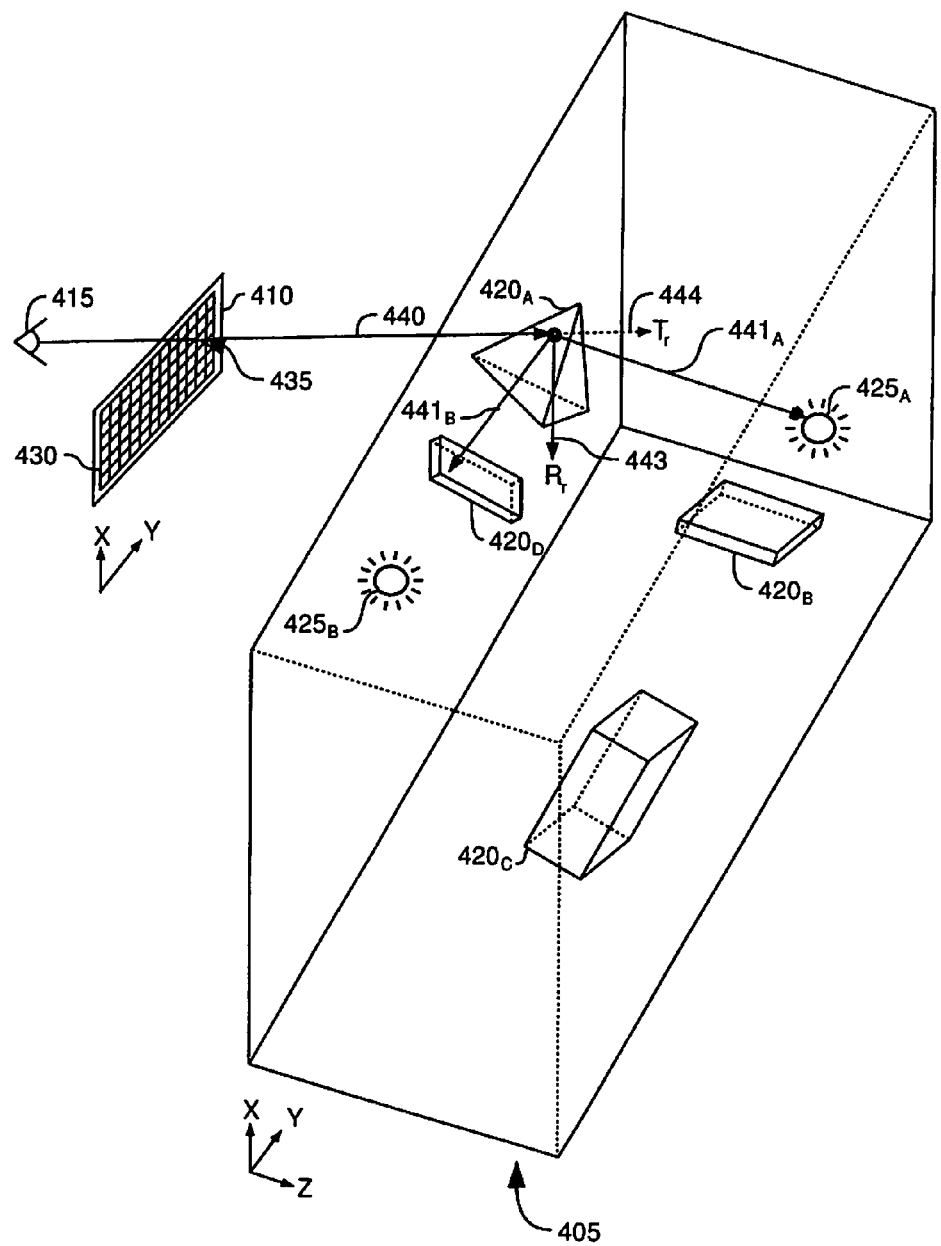
FIG. 4 is an exemplary three-dimensional scene to be rendered by an image processing system, according to one embodiment of the invention.

FIG. 4 is an exemplary three-dimensional scene 405 to be rendered by an image processing system. Within the three-dimensional scene 405 may be objects 420. The objects 420 in FIG. 4 are of different geometric shapes. Although only four objects 420 are illustrated in FIG. 4, the number of objects in a typical three-dimensional scene may be more or less. Commonly, three-dimensional scenes will have many more objects than illustrated in FIG. 4.

As can be seen in FIG. 4 the objects are of varying geometric shape and size. For example, one object in FIG. 4 is a pyramid $420_A$. Other objects in FIG. 4 are boxes $420_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 405 are light sources $425_{A-B}$. The light sources may illuminate the objects 420 located within the scene 405. Furthermore, depending on the location of the light sources 425 and the objects 420 within the scene 405, the light sources may cause shadows to be cast onto objects within the scene 405.

The three-dimensional scene 405 may be rendered into a two-dimensional picture by an image processing system. The image processing system may also cause the two-dimensional picture to be displayed on a monitor 410. The monitor 410 may use many pixels 430 of different colors to render the final two-dimensional picture.

One method used by image processing systems to rendering a three-dimensional scene 420 into a two dimensional picture is called ray tracing. Ray tracing is accomplished by the image processing system "issuing" or "shooting" rays from the perspective of a viewer 415 into the three-dimensional scene 420. The rays have properties and behavior similar to light rays.

One ray 440, that originates at the position of the viewer 415 and traverses through the three-dimensional scene 405, can be seen in FIG. 4. As the ray 440 traverses from the viewer 415 to the three-dimensional scene 405, the ray 440 passes through a plane where the final two-dimensional picture will be rendered by the image processing system. In FIG. 4 this plane is represented by the monitor 410. The point the ray 440 passes through the plane, or monitor 410, is represented by a pixel 435.

As briefly discussed earlier, most image processing systems use a grid 430 of thousands (if not millions) of pixels to render the final scene on the monitor 410. Each individual pixel may display a different color to render the final composite two-dimensional picture on the monitor 410. An image processing system using a ray tracing image processing methodology to render a two dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 435 in the two dimensional picture, the image processing system must determine if the ray 440 intersects an object within the scene. If the ray does not intersect an object within the scene it may be assigned a default background color (e.g., blue or black, representing the day or night sky). Conversely, as the ray 440 traverses through the three-dimensional scene the ray 440 may strike objects. As the rays strike objects within the scene the color of the object may be assigned the pixel through which the ray passes. However, the color of the object must be determined before it is assigned to the pixel.

Many factors may contribute to the color of the object struck by the original ray 440. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 440 intersected the object. For example, one type of secondary ray may be a shadow ray. A shadow ray may be used to determine the contribution of light to the point where the original ray 440 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 405. If the ray reaches the light source without encountering another object before the ray reaches the light source, then the light source will illuminate the object struck by the original ray at the point where the original ray struck the object.

For example, shadow ray $441_A$ may be issued from the point where original ray 440 intersected the object $420_A$, and may traverse in a direction towards the light source $425_A$. The shadow ray $441_A$ reaches the light source $425_A$ without encountering any other objects 420 within the scene 405. Therefore, the light source $425_A$ will illuminate the object $420_A$ at the point where the original ray 440 intersected the object $420_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $441_B$ may be issued from the point where the original ray 440 intersected with the object $420_A$, and may traverse in a direction towards the light source $425_B$. In this example, the path of the shadow ray $441_B$ is blocked by an object $420_D$. If the object $420_D$ is opaque, then the light source $425_B$ will not illuminate the object $420_A$ at the point where the original ray 440 intersected the object $420_A$. However, if the object $420_D$ which the shadow ray is translucent or transparent the light source $425_B$ may illuminate the object $420_A$ at the point where the original ray 440 intersected the object $420_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 444 is seen traversing through the object $420_A$ which the original ray 440 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 443 may be issued by the image processing system to determine what color or light may be reflected by the object $420_A$ which the original ray 440 intersected.

The total contribution of color and light of all secondary rays (e.g., shadow rays, transmitted rays, reflected rays, etc.) will result in the final color of the pixel through which the original ray passed.

An Exemplary Kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 5A:
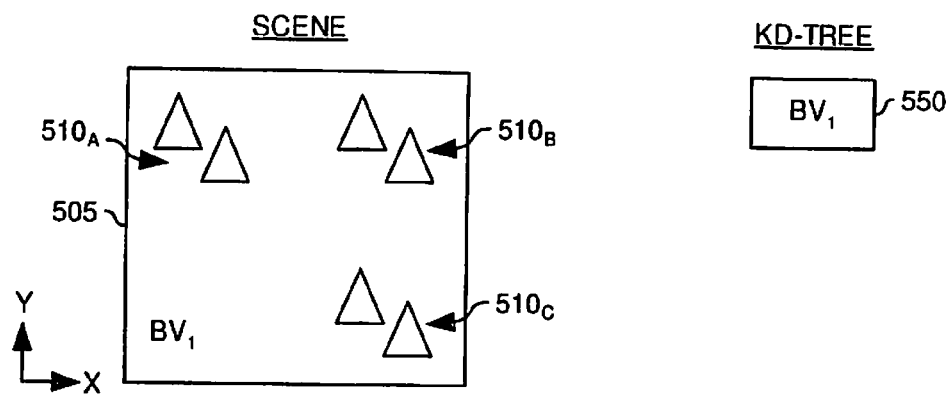
FIGS. 5A-5C illustrate a two dimensional space to be rendered by an image processing system and a corresponding spatial index created by an image processing system, according to one embodiment of the invention.
Figure 5B:
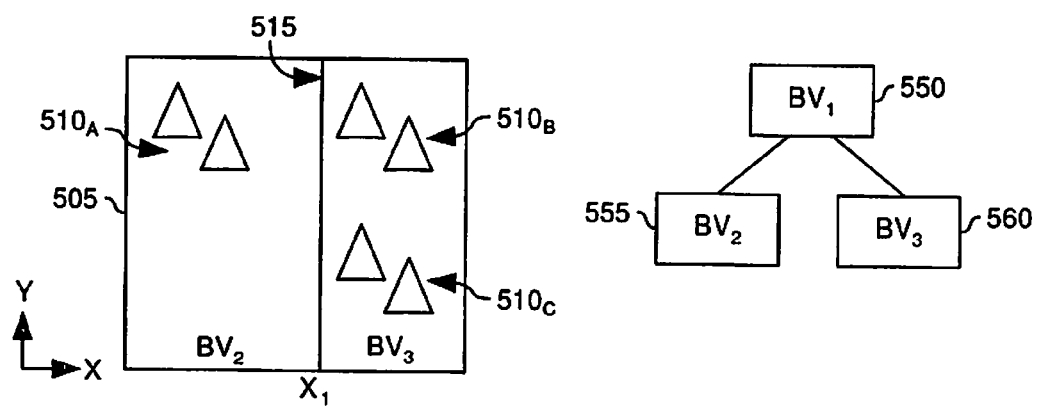
Figure 5C:
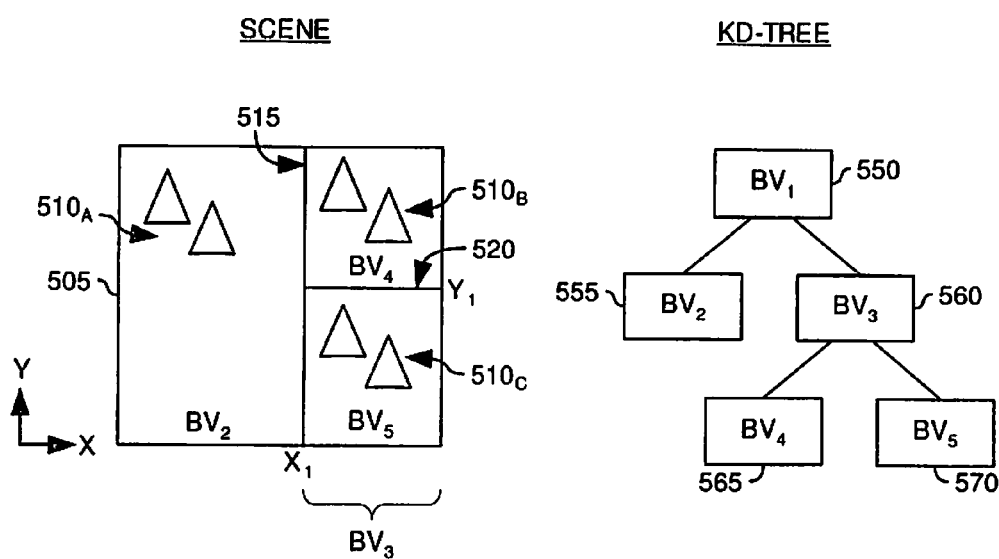

FIGS. 5A-5C illustrate a two dimensional space to be rendered by an image processing system and a corresponding kd-tree. For simplicity, a two dimensional scene is used to illustrate the building of a kd-Tree, however kd-Trees may also be used to represent three-dimensional scenes. In the two dimensional illustration of FIGS. 5A-5C splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 5A illustrates a two dimensional scene 505 containing primitives 510 to be rendered in the final picture to be displayed on a monitor 510. The largest volume which represents the entire volume of the scene is encompassed by bounding volume 1 ($BV_1$). In the corresponding kd-Tree this may be represented by the top level node 550, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 5A, $BV_1$ contains six primitives, therefore kd-Tree construction algorithm may partition $BV_1$ into smaller bounding volumes.

FIG. 5B illustrates the same two dimensional scene 505 as illustrated in FIG. 5A. However, in FIG. 5B the tree construction algorithm has partitioned $BV_1$ into two smaller bounding volumes $BV_2$ and $BV_3$. The partitioning of $BV_1$, was accomplished, by drawing a splitting plane $SP_1$ 515 along the x-axis at point $x_1$. This partitioning of $BV_1$ is also reflected in the kd-Tree as the two nodes 555 and 560, corresponding to $BV_2$ and $BV_3$ respectively, under the internal or parent node $BV_1$ 550. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $510_A$). Nodes which are not partitioned or sub-divided any further, such as $BV_2$, are referred to as leaf nodes.

FIG. 5C illustrates the same two dimensional scene 505 as illustrated in FIG. 5B. However, in FIG. 5C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 565 and 570, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $510_A$, leaf node $BV_4$ may contain pointers to primitives $510_B$, and leaf node $BV_5$ may contain pointers to primitives $510_C$.

The resulting kd-Tree structure, or other spatial index structure, may be stored in the shared memory cache 110. The kd-Tree and the size of corresponding data which comprises the kd-Tree may be optimized for storage in the shared memory cache 110.

Iterative Ray Tracing Algorithm

According to one embodiment of the invention, transforming the ray tracing algorithm from a recursive algorithm into an iterative algorithm may enable efficient distribution of workload related to ray tracing amongst a plurality of processing elements. An iterative ray tracing algorithm, in contrast to a recursive ray tracing algorithm, may allow separate processing elements to perform operations relating to determining the color of a single pixel and allow efficient use of processor resources (e.g., memory cache). Efficient distribution of workload amongst a plurality of processing elements may improve ray tracing image processing system performance.

An algorithm for performing ray tracing may be recursive in the sense that it issues an original ray into a three dimensional scene and finishes all ray tracing operations relating to the issued original ray (e.g., traces all secondary rays and performs all ray-object intersection tests) before issuing a subsequent original ray into the three dimensional scene.

For example, an image processing system may use a recursive ray tracing algorithm to render a two dimensional image from a three dimensional scene. The image processing system using a recursive ray tracing algorithm may use a processing element to perform ray tracing. The processor may be used to traverse a ray through a spatial index, and to determine if the ray intersects any objects within a bounding volume of the spatial index. If the ray intersects an object contained within a bounding volume, the image processing system, using the same processor, may issue secondary rays into the three dimensional scene to determine if they intersect any objects and, consequently, contribute color to the object intersected by the original ray. While performing operations related to determining if the secondary rays intersect objects within the three dimensional scene, the processor may store information defining the original ray in the processor's memory cache.

If the processing element determines that the secondary rays intersect objects within the three dimensional scene the image processing element may issue more secondary rays into the scene to determine if those secondary rays intersect objects and contribute color to the object intersected by the original ray. When performing calculations to determine if the secondary rays intersect objects within the three dimensional scene, the processor may store previous secondary ray information in the processor's memory cache. By issuing more and more secondary rays into the scene, the image processing system may finally determine the total contribution of color from secondary rays to the object intersected by the original ray. From the color of the object intersected by the original ray and the contribution of color due to secondary rays, the color of the pixel through which the original ray passed may be finally determined.

Although the recursive ray tracing algorithm determines the color of the pixel through which the original ray passed, each time the image processing system issues more secondary rays into the three dimensional scene, the recursive ray tracing image processing system places information which defines the previous rays (e.g., the original ray or previous secondary rays) into the memory cache of the processing element. The image processing system may store ray information in the cache in order to free registers which may be necessary to perform the calculations related to determining if the subsequent secondary rays intersect objects within the three dimensional scene. Consequently, the recursive ray tracing image processing system may place a large (relative to the size of the cache) amount of information into the processors memory cache for a single pixel.

By storing large amounts of ray information in the memory cache of the processor, there is little or no space in the processor's memory cache for information which defines the objects within the three dimensional scene (i.e., object geometry data). This information may need to be frequently fetched from main memory into the memory cache in order to perform operations to determine if the original or secondary rays intersect objects within the three dimensional scene (thereby "thrashing" the cache). Therefore, the limits of an image processing system which uses the recursive ray tracing technique may be limited by the access time to fetch information from main memory and place it in the processor's memory cache.

However, according to embodiments of the invention, the ray tracing algorithm may be partitioned into an iterative ray tracing algorithm. The iterative ray tracing algorithm may allow separate processing elements to perform portions of the ray tracing algorithm. By allowing separate processing elements to perform portions of the ray tracing algorithm, the amount of information which needs to be cached (e.g., original rays and secondary rays) may be reduced. Furthermore, according to embodiments of the invention, the iterative ray tracing algorithm may be used in conjunction with the low-latency high-bandwidth communications network and the shared memory cache 110 in order improve the performance of a ray tracing image processing system.

The low-latency high-bandwidth communications network of inboxes, as described above with regards to FIGS. 3A-3C, may be used to pass or send data processing information (e.g., information defining original rays and secondary rays) which has little use when tracing subsequent rays or rendering subsequent frames, according to embodiments of the invention. In addition, according to embodiments of the invention, the ray tracing image processing system may use a shared coherent memory cache to store information which may be used by the image processing system when tracing subsequent rays or performing ray tracing for a subsequent frame.

Figure 6:
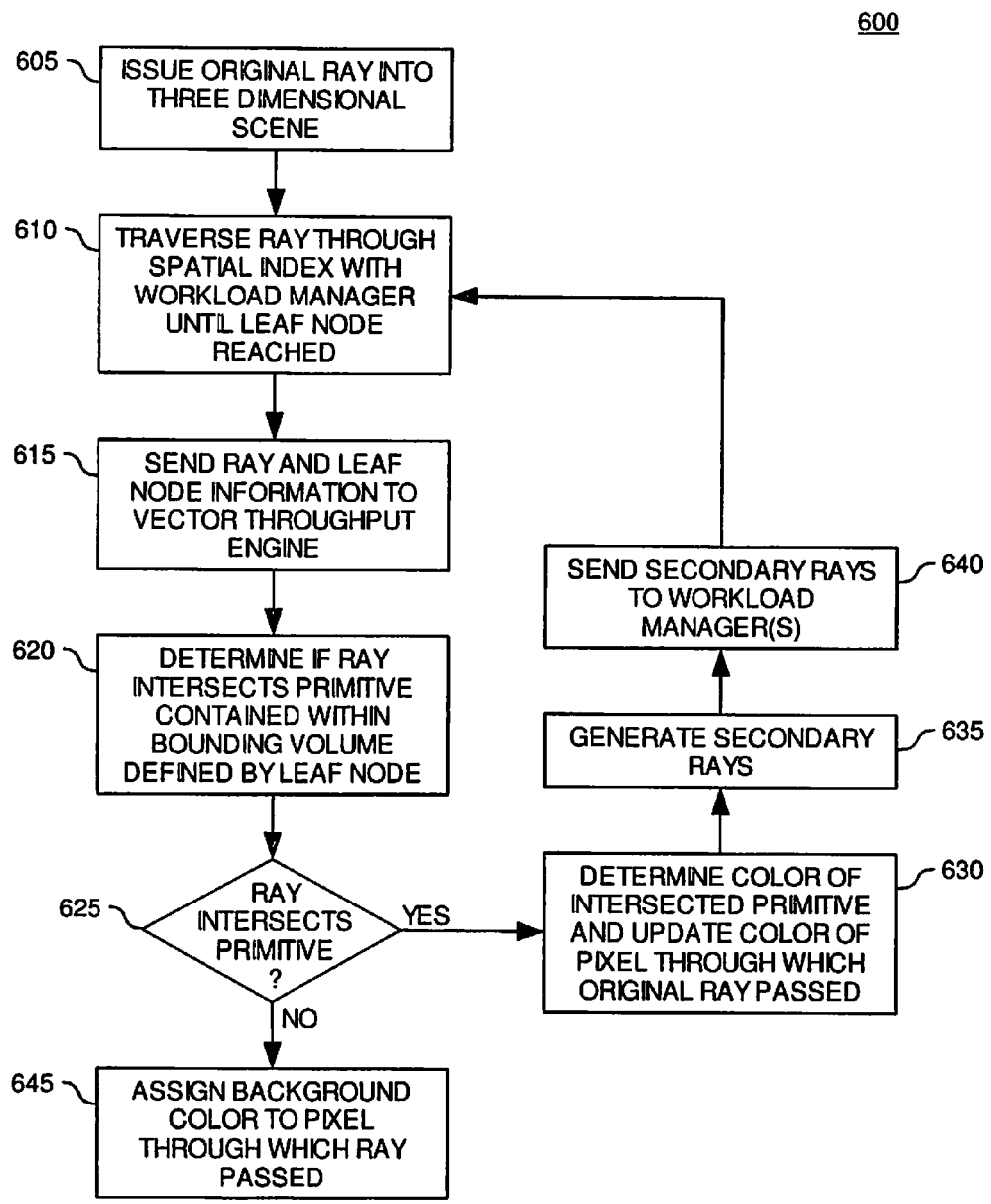
FIG. 6 is a flowchart illustrating a method of performing ray tracing, according to one embodiment of the invention.

FIG. 6 is a flowchart which illustrates a partitioned and thus iterative ray tracing algorithm or method 600 which may be used in a multi processor image processing system, according to one embodiment of the invention. The method 600 begins at step 605 when the image processing system issues an original ray into the three dimensional scene. The original ray may pass through a pixel as it traverses into the three dimensional scene. The original ray may be used to determine the color of the pixel through which the original ray passed.

Next, at step 610 the image processing system may use a use a workload manager 205 processing element to traverse the spatial index (e.g., kd-Tree). The spatial index may be stored within the shared memory cache 110 of the image processing system. Traversing the kd-Tree may include performing calculations which determine if the original ray intersects bounding volumes which are defined by nodes within the spatial index. Furthermore, traversing the spatial index may include taking branches to nodes which defined bounding volumes intersected by the ray. A workload manager 205 may use the coordinates and trajectory of an issued ray (e.g., the original ray) to determine if the ray intersects bounding volumes defined by the nodes in the spatial index. The workload manager 205 may continue traversing the spatial index until the original ray intersects a bounding volume which contains only primitives (i.e., a leaf node).

At step 615, after the workload manager 205 has traversed the original ray to a leaf node, the workload manager 205 may send the original ray and information which defines the leaf node to a vector throughput engine 210. The workload manager 205 may send information which defines the original ray and the leaf node (e.g., trajectory of the ray, pixel through which the original ray passed, bounding volume defined by the leaf node, etc.) to the vector throughput engine 210. The workload manager 205 may send the information to the vector throughput engine 210 by writing the information defining the ray and the intersected leaf node to the inbox of the vector throughput engine 210.

By coupling the pixel information with the information which defines the original ray, there is no need to send the original ray back to the workload manager 205 if the vector throughput engine 210 determines that the ray intersected an object and, consequently, determines a color of the pixel. According to one embodiment of the invention, the vector throughput engine 210 may use the pixel information to update the color of the pixel by writing to memory location within a frame buffer (e.g., stored in the shared memory cache 110) which corresponds to the pixel. By updating the pixel color as secondary rays intersect objects within the three-dimensional scene, the number of rays relating to the same pixel that need to be stored (e.g., in cache memory) may be reduced.

After the workload manager 205 sends the original ray information to the vector throughput engine 210, the image processing system may issue a subsequent original ray into the three dimensional scene. The workload manager 205 may immediately begin traversing this subsequently issued original ray through the spatial index after the workload manager 205 has sent the original ray to a vector throughput engine 210. Thus, the workload manager 205 may be continuously traversing rays through the spatial index, rather than wait until the determination of whether the original ray intersected an object is complete, as in a recursive ray tracing algorithm. Furthermore, the workload manager 205 may be traversing rays through the spatial index as the vector throughput engine 210 is determining if previously issued rays intersect objects within the bounding volumes defined by leaf nodes. According to one embodiment of the invention, vector throughput engines 210 may be responsible for performing ray-primitive intersection tests. That is, the vector throughput engines 210 may determine if a ray intersects any primitives contained within the bounding volume defined by the leaf node.

Therefore, at step 620, a vector throughput engine 210 that receives the ray and leaf node information in its inbox may perform ray-primitive intersection tests to determine if the ray intersects any primitives within the bounding volume defined by the leaf node. The geometry which defines the primitives may be stored within the shared memory cache 110, and thus may not need to be fetched from main memory. By storing the geometry for primitives in the shared memory cache 110, the iterative ray tracing algorithm may not need to fetch the geometry from main memory as is the case with the recursive ray tracing algorithm. If the vector throughput engine 210 determines that the original ray intersected a primitive contained within the bounding volume defined by the leaf node, the vector throughput engine 210 may proceed to step 630.

At step 630, the vector throughput engine 210 may determine the color of the intersected primitive at the point which the original ray intersected the primitive. For example, the color of the primitive may be stored in the shared memory cache 110 and the vector throughput engine 210 may read the color information from the shared memory cache 210.

After determining the color of the primitive at the ray-primitive intersection point, the vector throughput engine 210 may update the color of pixel through which the ray passed. This may be accomplished, for example, by writing to a memory location within a frame buffer which corresponds to the pixel through which the original ray passed. By updating the pixel information as a ray-primitive intersection is determined and before determining the color contributions for all secondary rays relating to a original ray, the amount of information which may need to be stored in a memory cache may be reduced. In contrast, a recursive ray tracing algorithm may not store the color of the pixel in a frame buffer until all color contributions from secondary rays have been determined, which increases the amount of information which may need to be stored in a processor's memory cache.

After updating the pixel color, the vector throughput engine 210 may proceed to step 635, where the vector throughput engine 210 may generate secondary rays. As described previously with regards to FIG. 4, a ray tracing image processing system may use secondary rays determine additional color contribution to the intersected object and thus to the pixel through which the original ray passed. Secondary rays may be, for example, reflected rays, transmitted (refracted) rays, or shadow rays. Generating secondary rays may include, for example, determining the trajectory of the secondary rays based on the trajectory of the original ray, surface properties of the intersected object, and an angle of intersection of the original ray with the intersected object.

After generating secondary rays, the vector throughput engine 210, at step 640 may send the secondary rays to a workload manager 205. The vector throughput engine 210 may send the secondary rays to a workload manager 205 by placing the information which defines the secondary rays (e.g., trajectory, information defining the pixel through which the original ray passed, etc.) in an inbox 115 of a workload manager 205. According to one embodiment of the invention, the vector throughput engine 210 may send the secondary rays to the workload manager 205 which traversed the original ray through the spatial index. However, according to another embodiment of the invention, the image processing system may contain a plurality of workload managers and the vector throughput engine 210 may send the secondary rays to a workload manager which did not traverse the original ray through the spatial index.

After sending the secondary rays to a workload manager 205, the vector throughput engine 210 may retrieve other information defining rays from an inbox which may be waiting to have ray-primitive intersection tests performed. The rays waiting in the vector throughput engine's 210 inbox may have been previously traversed through a spatial index by a workload manager 205. Therefore, the vector throughput engine 210 may perform more ray-primitive intersection tests to determine if rays (i.e., original or secondary) intersect objects within bounding volumes defined by leaf nodes. Thus, the vector throughput engine 210 may continuously perform operations related to ray-primitive intersection tests, determining primitive colors, updating pixel colors, and generating secondary rays.

After receiving a secondary ray from a vector throughput engine 210, a workload manager 205 may execute steps 610 and 615, as described above, to determine if the secondary ray intersects a leaf node.

Returning to step 625, if the vector throughput engine 210 determines that the ray did not intersect a primitive contained within bounding volume defined by the leaf node, the vector throughput engine 210 may assign the pixel through which the original ray passed a background color of the three-dimensional scene. The background color may be assigned to the pixel because the original ray did not intersect any primitives contained within the three dimensional scene. However, according to other embodiments of the invention, if the ray did not intersect any primitives contained within the leaf-node bounding volume, the vector throughput engine 210 may send the ray back to a workload manager 205 such that the workload manager 205 may traverse the ray through the spatial index again to determine if the ray intersected any other leaf nodes containing primitives.

Exemplary Use of an Iterative Ray Tracing Algorithm

Figure 7:
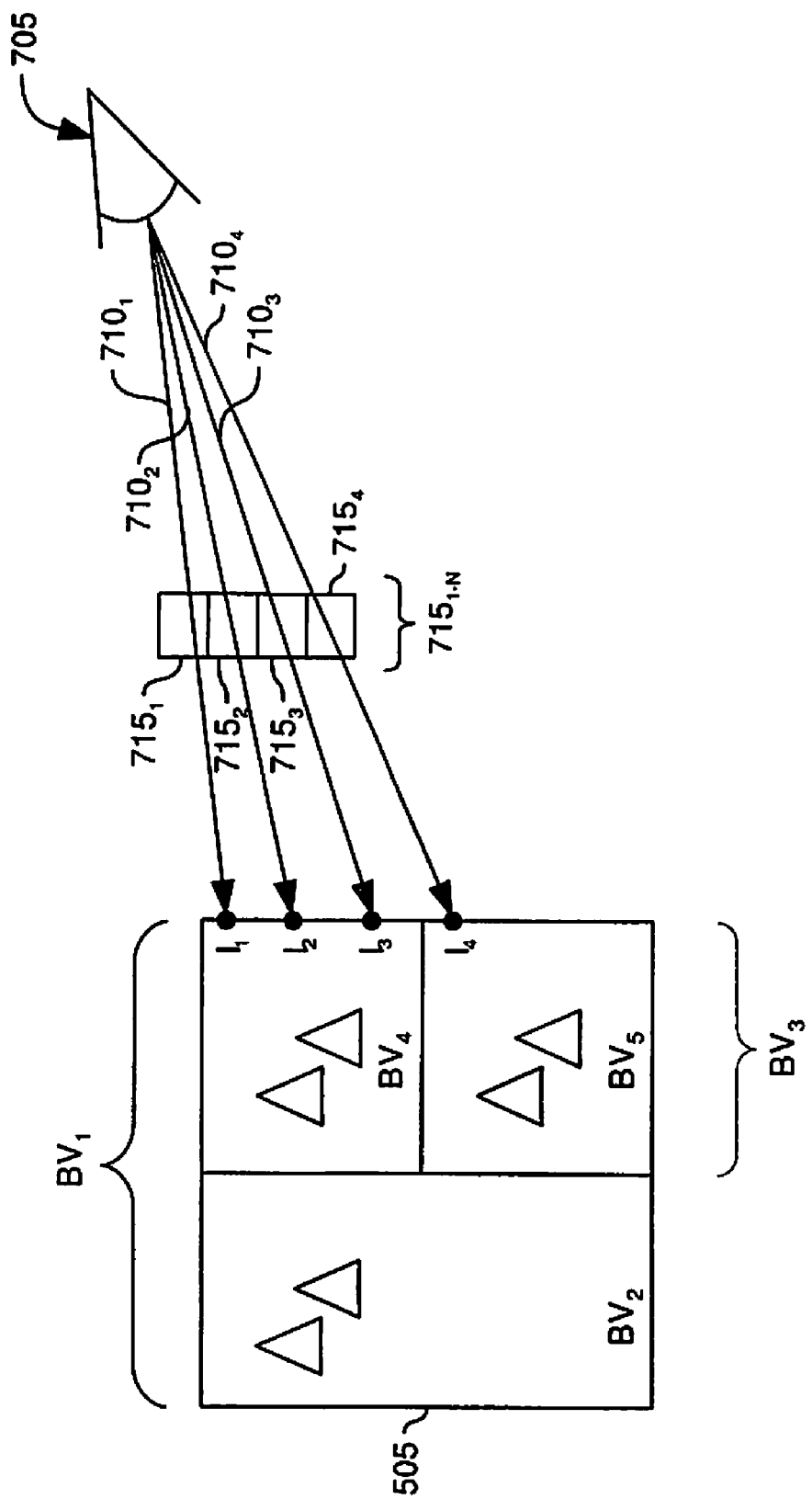
FIG. 7 is an exemplary three-dimensional space to be rendered by an image processing system, according to one embodiment of the invention.

FIG. 7 illustrates exemplary rays issued from an image processing system into a three dimensional scene 505, according to one embodiment of the invention. For clarity, the three dimensional scene 505 is the same as the three-dimensional scene used in FIGS. 5A-5C to illustrate the construction of a kd-tree. Therefore, the kd-tree which corresponds to the three dimensional scene 505 is the same as the kd-tree which was constructed with regards FIGS. 5A-5C. As illustrated in FIG. 7, a viewer 705 represents the origin of a plurality of original rays $710_{1-4}$ which may be issued into the three dimensional scene 505 by the image processing system. As each original ray $710_{1-4}$ is issued into the three-dimensional scene, the original rays may first pass through a corresponding pixel in a grid (frame) of pixels 715. Although only four pixels 715 and four original rays $710_{1-4}$ are illustrated in FIG. 7, to render a final two dimensional image from a three dimensional scene many more pixels may be necessary, and many more original rays may be issued.

A first original ray $710_1$ may be issued by the image processing system and pass through a first pixel $715_1$. The first original ray $710_1$ may intersect bounding volume 4 ($BV_4$) at an intersection point $I_1$. To facilitate understanding, the image processing system in this example may follow a pattern of issuing rays starting from the top of the grid of pixels 715 and continue issuing rays, one ray per pixel, moving down the grid of pixels until a ray has been issued for each pixel in the grid of pixels.

A second original ray $710_2$ and a third original ray $710_3$ may also be issued by the image processing system which may pass through a second pixel $715_2$ and a third pixel $715_3$ respectively. The second original ray $710_2$ and the third original ray $710_3$ may also intersect $BV_4$ at a second intersection point $I_2$ and a third intersection point $I_3$, respectively. Thus the first original ray $710_1$, the second original ray $710_2$, and the third original ray $710_3$ all intersect the same bounding volume. Furthermore, a fourth original ray $710_4$ may be issued by the image processing system and may pass through a fourth pixel $815_4$. The fourth original ray $710_4$, in contrast to the first three original rays $710_{1-3}$, may intersect bounding volume 5 ($BV_5$) at intersection point $I_4$.

Figure 8A:
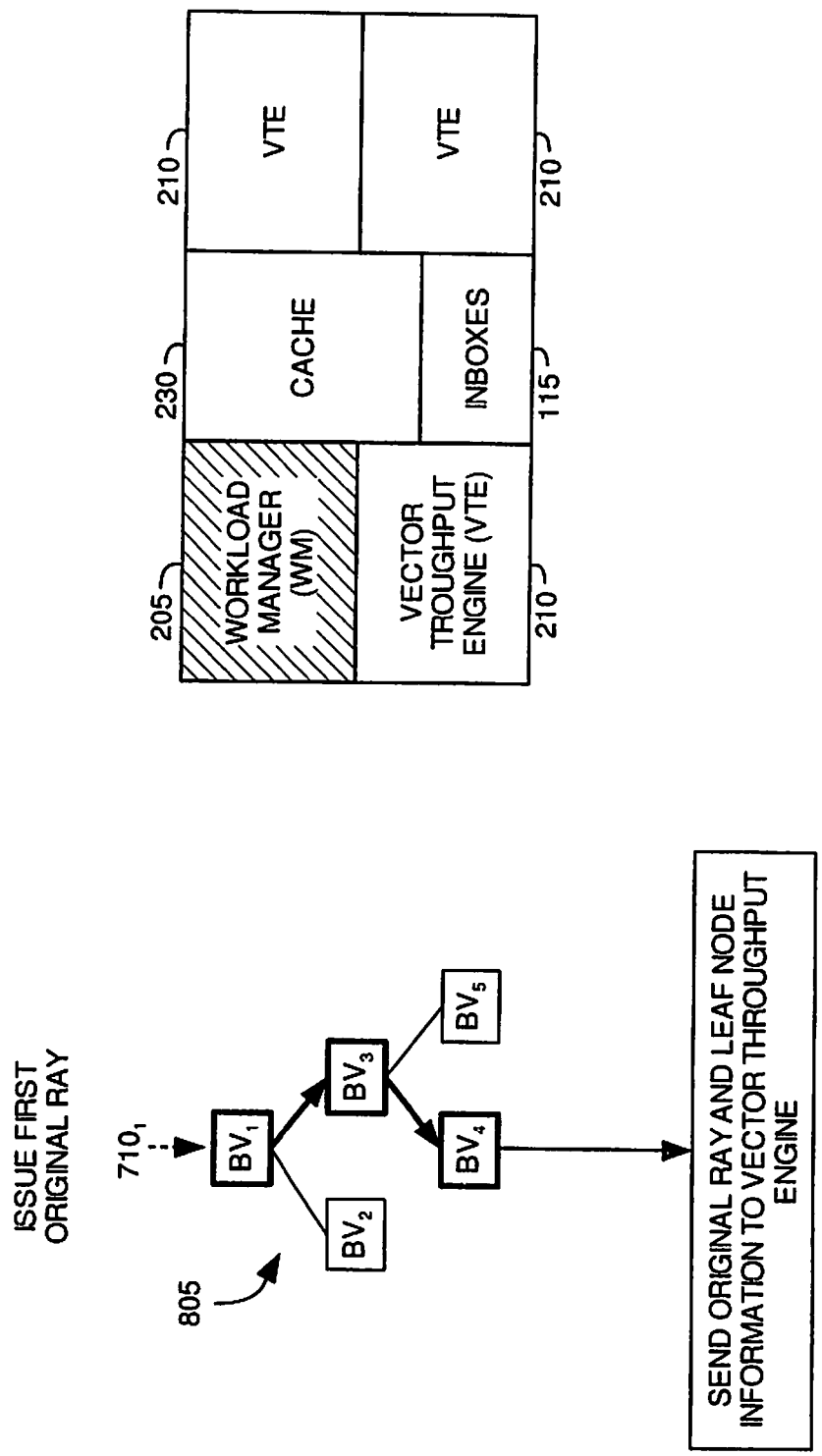
FIGS. 8A-8D illustrate a method of performing ray tracing, according to one embodiment of the invention.

FIG. 8A illustrates the traversal of the first original ray $710_1$ ray through a spatial index 805 (e.g., a kd-tree). Furthermore, as indicated by the shaded box 205, FIG. 8A illustrates a workload manager 205 performing operations related to the traversal of the first original ray $710_1$ through the spatial index 805. The workload manager 205 may traverse the ray through the spatial index 805 by taking branches to nodes defining bounding volumes intersected by the ray until a leaf node is reached (as illustrated in FIG. 8A by the darkened branches and nodes). As illustrated in FIG. 7 the original ray $710_1$ intersects $BV_4$, therefore, the workload manager 205 will traverse the first original ray $710_1$ to the leaf node which defines $BV_4$. After traversing the ray to a leaf node, the workload manager 205 may send the first original ray $710_1$ (e.g., send information which defines the first original ray $710_1$ and information which defines the pixel $715_1$ through which the first original ray passed) and information defining the intersected leaf node (i.e., BV$_4$) to a vector throughput engine 210.

According to embodiments of the invention, after the workload manager 205 sends the first original ray 710$_1$ to a vector throughput engine 210, the workload manager 205 may begin traversing the second original ray 710$_2$ through the spatial index. Thus, the workload manager 205 may be constantly traversing rays through the spatial index 805 while the vector throughput engines 210 are determining if rays intersect objects within the bounding volumes defined by traversed to leaf nodes.

Figure 8B:
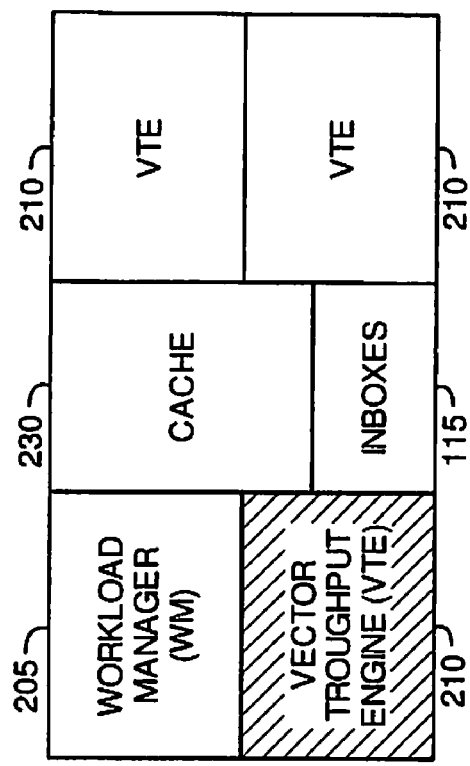
Figure 8B:
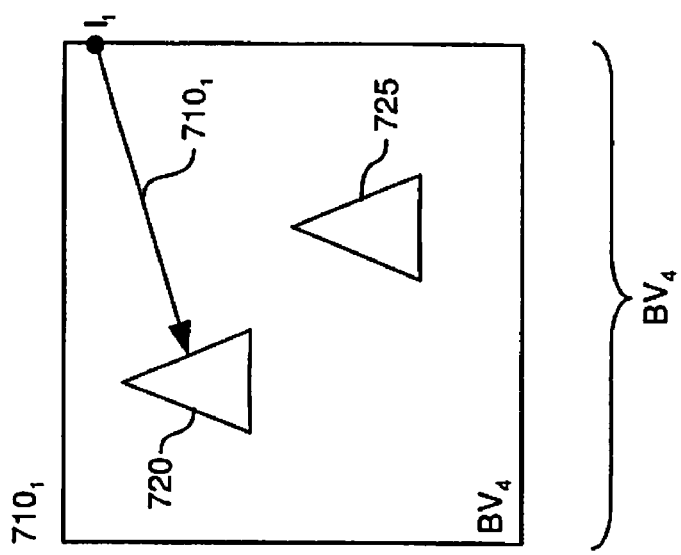

FIG. 8B illustrates the first original ray 710$_1$ traversing through the bounding volume 4 (BV4). Furthermore, as indicated by the shaded box, FIG. 8B illustrates the vector throughput engine 210 performing ray-primitive intersection tests after the vector throughput engine has received the information defining the first original ray 710$_1$ and the information defining the bounding volume BV$_4$. As described with regards to FIG. 6, the vector throughput engine 210 may execute ray-primitive intersection tests to determine if the original ray 710$_1$ intersects primitives contained within the bounding volume BV$_4$.

The vector throughput engine 210 may perform tests with the first original ray 710$_1$ against a first object 720 within the bounding volume BV$_4$, and against a second object 725 within the bounding volume BV$_4$. As illustrated in FIG. 8B, the vector throughput engine 210 may determine that the first original ray 710$_1$ intersects the first object 720.

As described previously with respect to method 600, after determining that the first original ray 710$_1$ intersects an object, the vector throughput engine 210 may determine the color of the first object 720 at the point which the first original ray 710$_1$ intersected the first object 720. After determining the color of the object 720 at the intersection point, the vector throughput engine 210 may update the color of the pixel 715$_1$ through which the first original ray 710$_1$ passed (e.g., by writing to a frame buffer memory location which corresponds to the pixel 715$_1$).

Figure 8C:
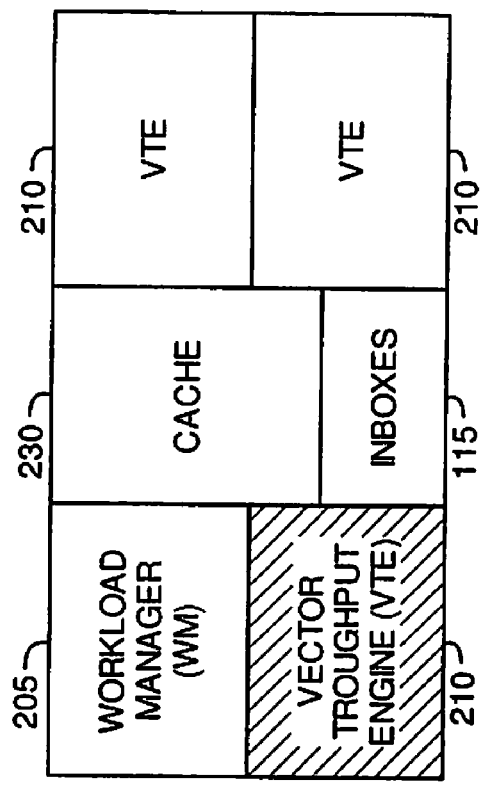
Figure 8C:
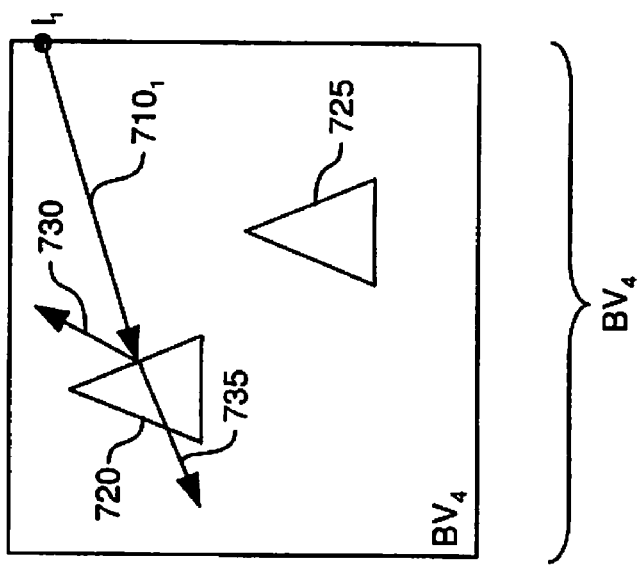

After determining the color of the object 720 at the intersection point, the vector throughput engine 210 may generate secondary rays. For example, as illustrated in FIG. 8C the vector throughput engine 210 may generate a reflected ray 730 and a transmitted (refracted) ray 735. Both secondary rays (730 and 735) originate from the point where the first original ray 7101 intersected the object 720. As described above, the secondary rays may be used to determine additional color contribution to the object at the point which the first original ray 710$_1$ intersected the object 720. The generation of the secondary rays may include determining a trajectory for each secondary ray and tagging the secondary ray such that the additional color contribution from the secondary ray may be used to update the color of the pixel 715$_1$ through which the first original ray 710$_1$ passed.

Figure 8D:
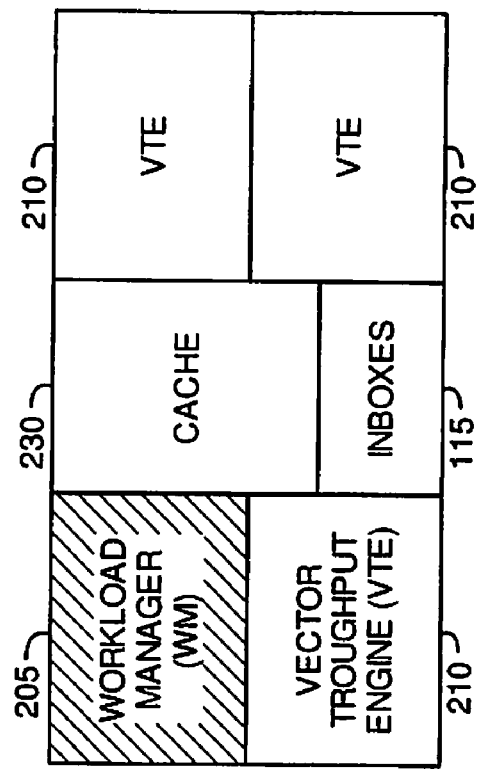
Figure 8D:
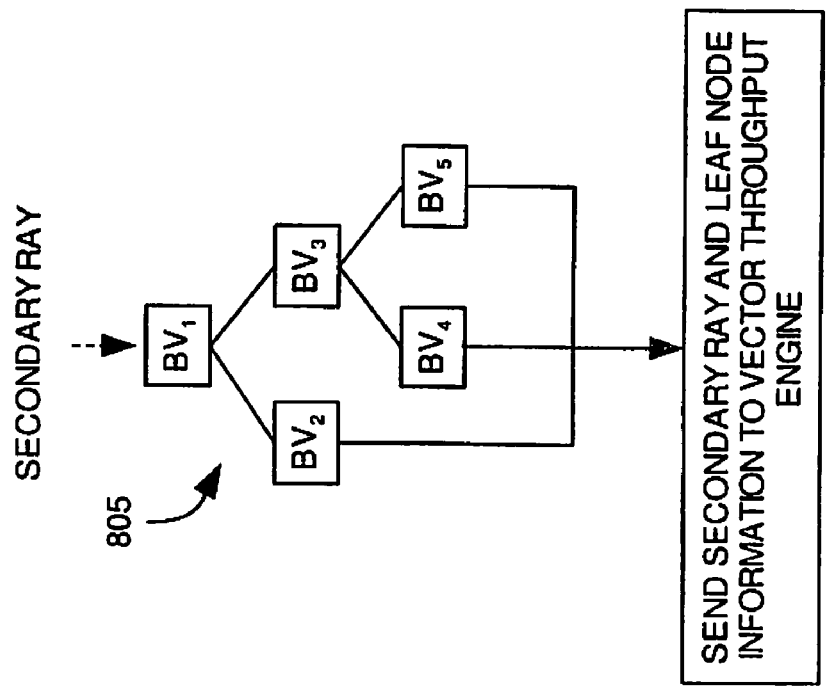

After generating the secondary rays (730 and 735), the vector throughput engine 210 may send the secondary rays (730 and 735), via an inbox, to a workload manager 205. A workload manager 205 which receives the secondary rays (730 and 735) may use the information which defines the secondary rays (i.e., trajectory of secondary rays) to traverse the spatial index 805. For example, the shaded box in FIG. 8D illustrates a workload manager 205 which may traverse the spatial index 805 with a secondary ray (e.g., 730) which was generated by a vector throughput engine 210. The workload manager 205 may traverse the secondary ray to a leaf node. After the secondary ray has been traversed to a leaf node, the workload manager 205 may send the secondary ray and information defining the bounding volume intersected by the secondary ray to a vector throughput engine 210 to determine if the secondary ray intersects any objects with the bounding volume intersected by the secondary ray.

As the vector throughput engines 210 determine that the original ray or secondary rays strike objects within the three dimensional scene, the color of the pixel through which the original ray passed may be updated within the frame buffer. According to embodiments of the invention, all secondary rays relating to an original ray, and thus to the pixel through which the original ray passed, may be traced through the three dimensional scene and their color contributions saved in the frame buffer to determine the final color of the pixel. However, according to other embodiments of the invention, a finite number of secondary rays relating to the original ray may be traced through the three dimensional scene to determine the color of the pixel. By limiting the number of secondary rays which are traced through the three dimensional scene and thus contribute to the color of the pixel, the amount of processing necessary to determine a final color of the pixel may be reduced.

Adaptive Ray Data Reorder for Optimized Spatial Index Traversal

As described above, a vector throughput engine (VTE) may 210 generate secondary rays after a ray intersects an object (primitive) within the three dimensional scene. The secondary rays generated by the VTE 210 may have various trajectories or originating locations within the three dimensional scene. The trajectory and originating location may be dependent on, for example, the location of the intersected object, the trajectory of the ray which intersected the object, surface properties of the intersected object, and/or the location of light sources within the three dimensional scene. After generating secondary rays, as described above, the VTE 210 may send the secondary rays to a workload manager 205, wherein the workload manager 205 may traverse the secondary rays through a spatial index to determine if the secondary rays intersect objects within the three dimensional scene.

The workload manager 205 may traverse a secondary ray through the spatial index by taking branches to nodes which represent bounding volumes within the three dimensional scene. The entire spatial index may be stored in system memory, while portions of the spatial index may be stored within the cache memory (e.g., shared L2 cache 110) accessible by the workload manager 205. Due to size limits of the cache, the workload manager 205 may only be able to store a portion of the spatial index information in its cache at a given time. For example, only the most recently used portions of the spatial index may be present in the workload manager 205 cache when the workload manager 205 begins traversing a subsequent ray through the spatial index. If the VTE 210 sends the secondary rays to the workload manager as it generates them, they may have various (different) trajectories and/or locations within the three dimensional scene. Due to the differing trajectories and/or locations, the secondary rays may be traversed to different portions of the spatial index than previous rays. Consequently, the secondary rays may cause a large number of cache misses, because the spatial index information for the secondary rays may not be present in the workload manager cache. In response to the cache misses the correct spatial index information may need to be fetched from memory each time a subsequent secondary ray is traversed through the spatial index. These constant cache misses or fetching of data from memory and placing it in the cache (i.e., cache "thrashing"), may diminish the performance of the image processing system by increasing the time necessary to traverse secondary rays through the spatial index.

To reduce cache misses caused by secondary rays, according to one embodiment of the invention, secondary rays may be reordered based on similarities between secondary rays before they are traversed through a spatial index. The workload manager 205 may then traverse the secondary rays through the spatial index according to the new order. The similarities between the secondary rays may be based on any number of factors which may cause similar secondary rays to traverse through the same or similar portions of the spatial index. For example, similar trajectory of the secondary rays and similar originating location of the secondary rays within the three dimensional scene may cause secondary rays to traverse through the same or similar portions of the spatial index.

Consequently, a workload manager 205 which traverses the secondary rays through the spatial index according to the new order may not experience as many cache misses as traversing the secondary rays through the spatial index in the order which the VTE 210 generated the secondary rays. The reduction of cache misses may reduce the time necessary to traverse the secondary rays through a spatial index and, thus, improve the performance of the image processing system.

Figure 9:
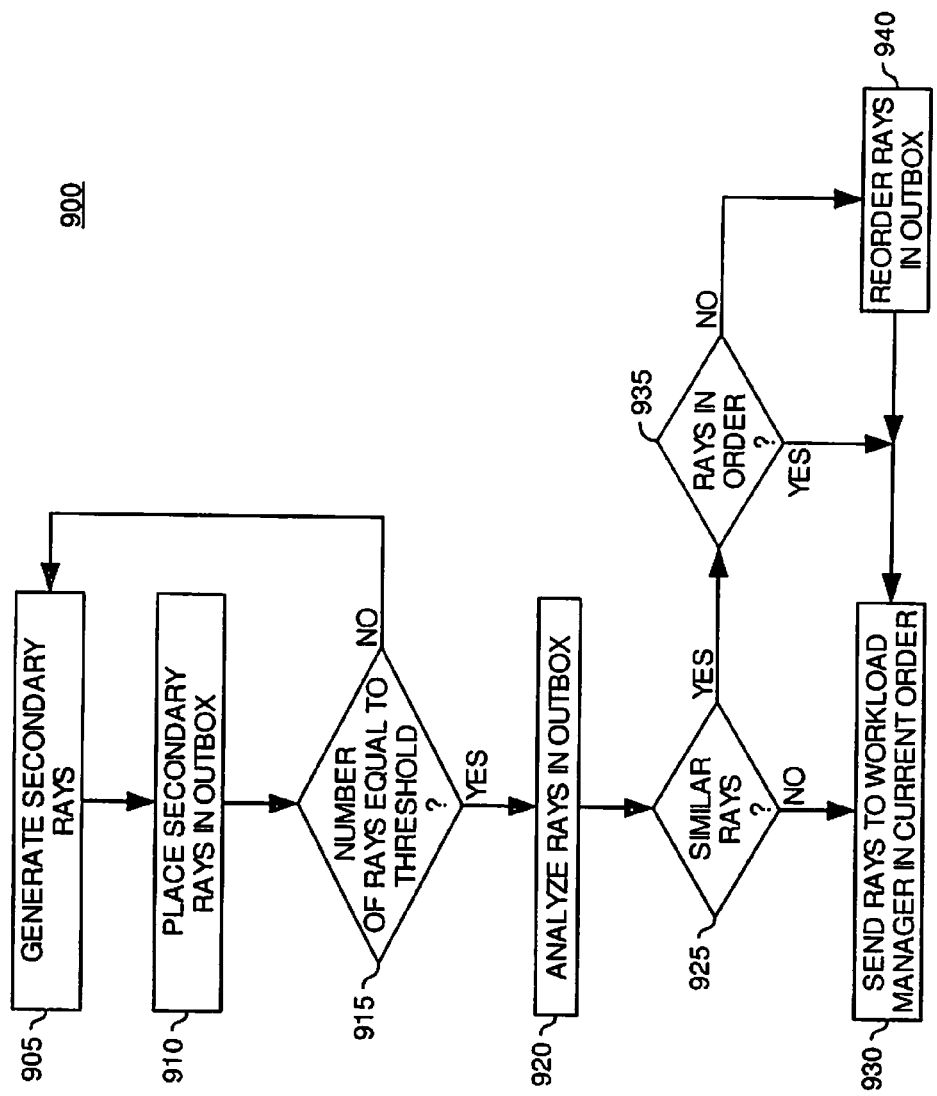
FIG. 9 is a flowchart illustrating an exemplary method of reordering rays, according to one embodiment of the invention.

FIG. 9 illustrates a method 900 of reordering secondary rays based on similarities of the secondary rays, according to one embodiment of the invention. The method 900 begins at step 905 when a VTE 210 generates secondary rays. As described previously, the VTE 210 may generate secondary rays when the VTE 210 determines that a ray (e.g., an original ray or a previously generated secondary ray) intersects an object within the three-dimensional scene. Generation of the secondary ray may include calculating the trajectory and the originating location of the secondary ray within the three dimensional scene.

After the VTE has generated a secondary ray, at step 910 the VTE may place the secondary ray (e.g., place the trajectory and originating location information which defines the secondary ray) into an outbox. As described previously with respect to FIGS. 3A-C, a thread (e.g., a VTE 210) may use an inbox (e.g., inbox 302) as an outbox to communicate information to other threads. The rays may be placed into the outbox before sending the secondary rays to a workload manager so that the VTE 210 may pool a number of secondary rays before reordering the secondary rays according to similarities.

After placing a secondary ray in the outbox, the VTE 210 may proceed to step 915 where the VTE 210 may check the outbox to determine if the number of secondary rays in the outbox is equal to a threshold. The threshold may be used to determine if it is time to reorder and send the secondary rays to a workload manager, or if more secondary rays need to be generated. A large threshold may be desired in order to increase the probability that similar secondary rays will be present in the outbox when the VTE 210 reorders the rays. However, the number of secondary rays which may be stored in the outbox may be limited, for example, by the amount of memory space allocated to the outbox.

If the number of secondary rays in the outbox does not meet the threshold, the VTE 210 may return to step 905 to generate more secondary rays. However, if the number of secondary rays in the outbox does meet the threshold, the VTE 210 may proceed to step 920.

At step 920 the VTE 210 may analyze the secondary rays in the outbox for similarities. Similar secondary rays may share ray attributes which may cause the secondary rays to traverse the same or a similar portion of the spatial index. For example, a similarity between two secondary rays may include, but is not limited to, two secondary rays with similar trajectories and originating from similar locations within the three-dimensional scene.

After analyzing the rays in the outbox, the VTE 210 may proceed to step 925 where the VTE may determine if similar rays were found in the outbox. If not, the VTE 210 may proceed to step 930 where the VTE may send the rays in the outbox to the workload manager. If the VTE 210 determined that there were no similar rays in the outbox at step 930, no benefit would be gained by reordering the rays currently in the outbox. Therefore, at step 930 the VTE 210 may send the rays to a workload manager 205 in the order which they were generated and placed in the outbox.

However, if at step 925 the VTE 210 determines (based on the analysis executed in step 930) that similar rays are present in the outbox, the VTE 210 may proceed to step 935. At step 935 the VTE 210 may determine if the rays are in order according to their similarities. If the rays are in order according to their similarities, no benefit would be gained by reordering the rays currently in the outbox. Therefore, the VTE 210 may proceed to step 930 to send the rays to a workload manager 205 in the order which they were generated and placed into the outbox.

However, if at step 935, the VTE 210 determines that the rays are not in order according to their similarities, the VTE 210 may proceed to step 940. At step 940 the VTE 210 may reorder the secondary rays present in the outbox. The VTE 210 may reorder the secondary rays such that a workload manager 205 which receives the secondary rays will traverse the secondary rays in the order determined by the VTE 210. After reordering the rays in the outbox, the VTE 210 may proceed to step 930 where the VTE 210 may send the rays to a workload manager 205 for spatial index traversal.

The workload manager 205 may traverse the similar secondary rays in the order determined by the VTE 210 (i.e., in the order according to the outbox). This order may ensure that the spatial index data used when traversing the similar secondary rays will still be present within the cache of the workload manager 205. Thus, the reordering will cause fewer cache misses than if the VTE 210 had sent the secondary rays to the workload manager 205 in the order which the VTE 210 generated the secondary rays.

Exemplary Adaptive Ray Data Reorder for
Optimized Spatial Index Traversal

Figure 10:
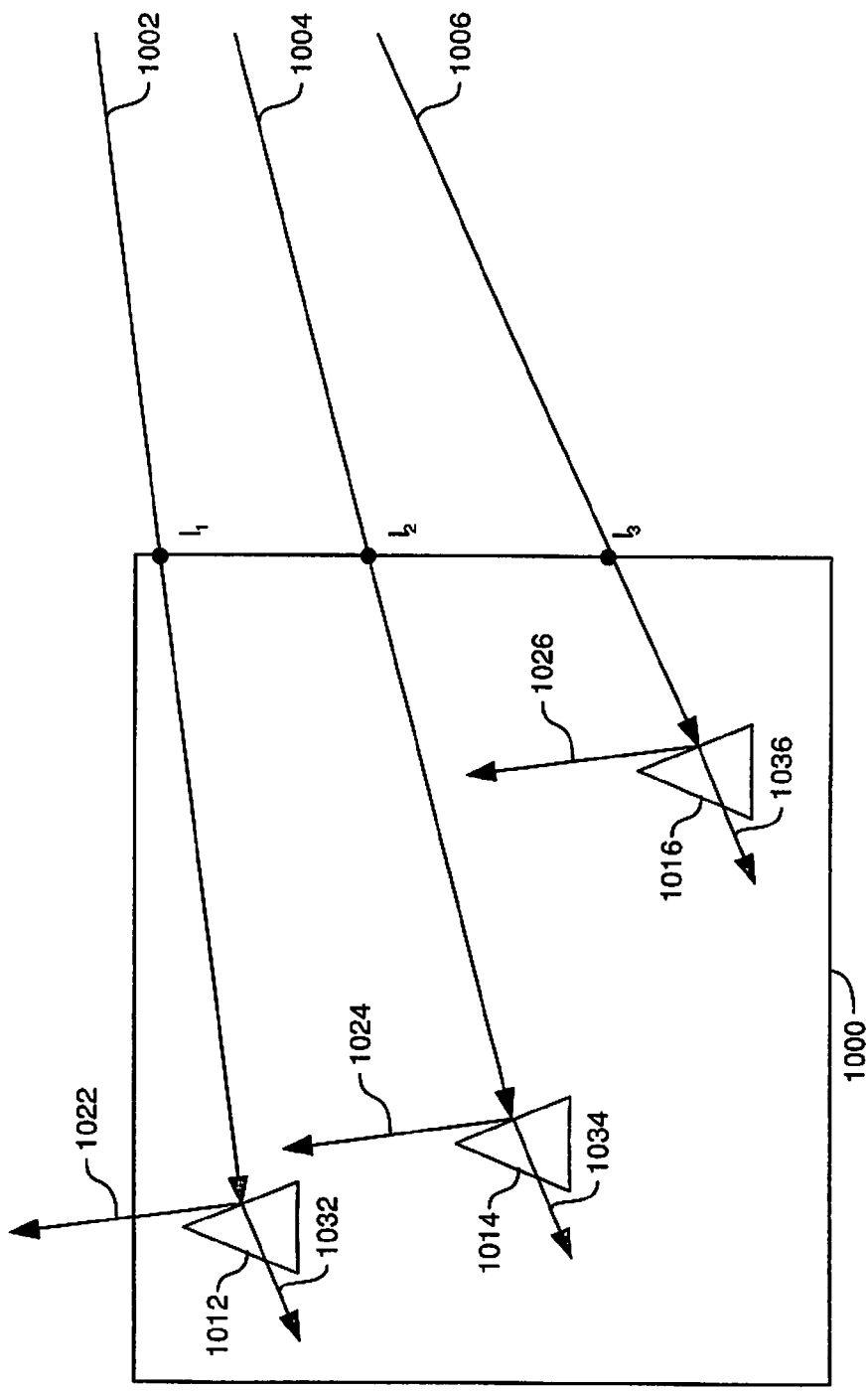
FIG. 10 illustrates an exemplary bounding volume containing objects within a three dimensional scene, according to one embodiment of the invention.

FIG. 10 illustrates an exemplary bounding volume 1000 for which a VTE 210 may be responsible for performing operations relating to determining if rays intersect primitives, according to one embodiment of the invention. As illustrated in FIG. 10, three rays enter the bounding volume 1000. A first ray 1002 intersects the bounding volume 1000 at point $I_1$, a second ray 1004 intersects the bounding volume 1000 at point $I_2$, and a third ray 1006 intersects the bounding volume 1000 at point $I_3$.

The VTE 210 may perform operations on the rays as they are sent from a workload manager 205. For example, the first ray 1002 may have been previously traversed through a spatial index by a workload manager 205 to bounding volume 1000. The workload manager 205 may then have sent the first ray 1002 to the VTE 210 for ray-primitive intersection tests. As illustrated in FIG. 10, the VTE 210 may determine from the ray-primitive intersection tests that the first ray 1002 intersects a first object 1012. In response to the intersection the VTE 210 may generate secondary rays.

Figure 11:
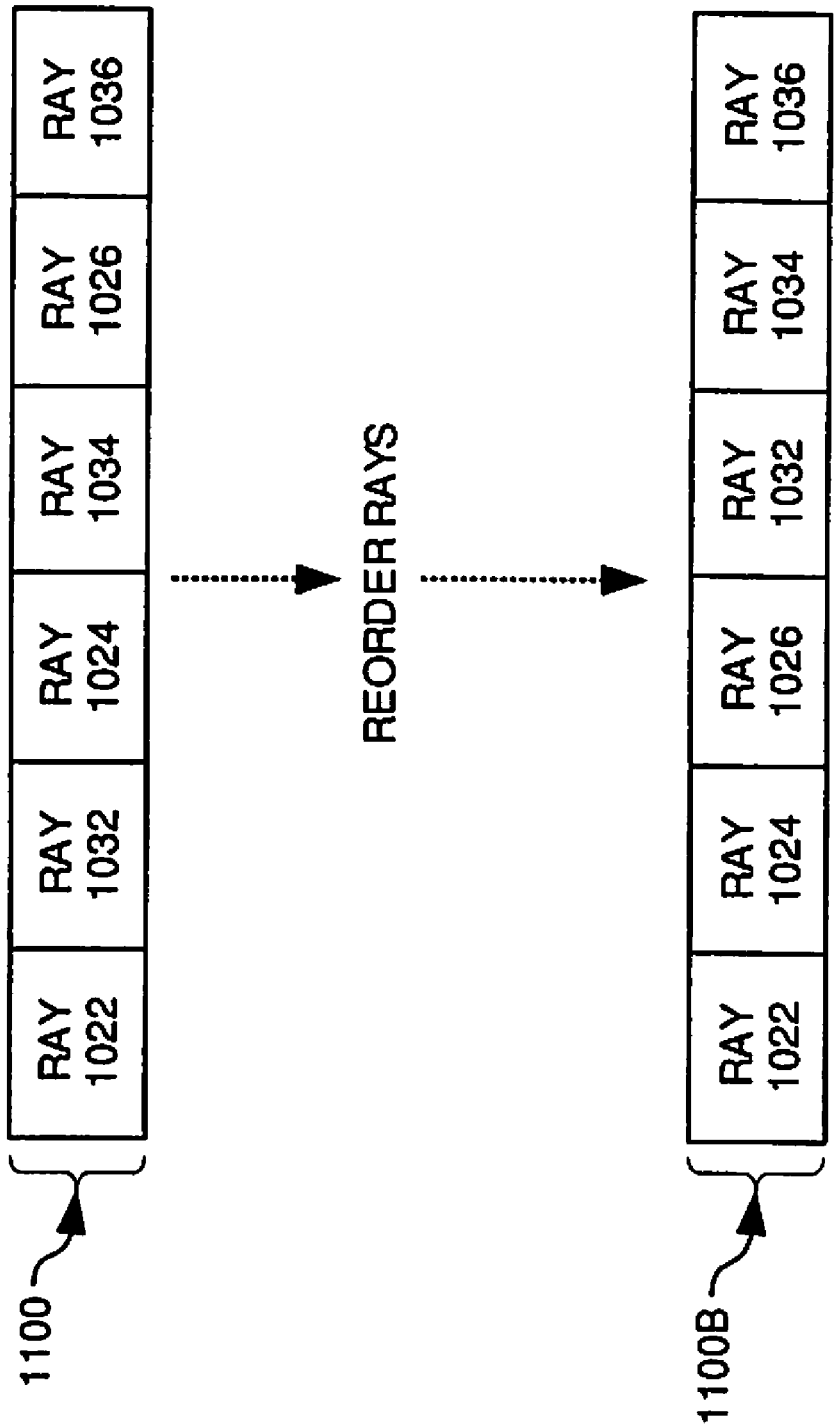
FIG. 11 illustrates an exemplary outbox in a ray tracing image processing system, according to one embodiment of the invention.

The VTE 210 may initially generate a first reflected ray 1022 (a secondary ray generated based on the reflective properties of the first object 1012) and place the first reflected ray 1022 in an outbox, as described above with respect to method 900. FIG. 11 illustrates an outbox 1100 into which the VTE 210 may place secondary rays as they are generated. As illustrated in FIG. 11, the VTE 210 may place the first reflected ray 1022 in the first location (i.e., left most location) of the outbox 1100.

After placing the first reflected ray 1022 into the outbox 1100, the VTE 210 may generate more secondary rays due to the intersection of the first ray 1002 and the first object 1002. For example, the intersection of the first ray 1002 and the first object 101 2 may also cause the VTE 210 to generate a first refracted ray 1032 (a secondary ray generated based on the refractive properties of the first object 1012). The VTE 210 may then place the first refracted ray 1032 into the outbox 1100 in the first available location. For example, as illustrated in FIG. 11, the VTE 210 may place the first refracted ray 1032 in a location within the outbox 110 which is immediately adjacent to the first reflected ray 1022.

The VTE 210 may also determine that the second ray 1004 intersects a second object 1014. Consequently, the VTE210 may generate a second reflected ray 1024 and a second refracted ray 1034, and the VTE 210 may place those rays in the outbox 1100. Furthermore, the VTE 210 may also determine that the third ray 1006 intersects a third object 1016. Consequently, the VTE 210 may generate a third reflected ray 1026 and a third refracted ray 1036, and the VTE 210 may place those rays in the outbox 1100 as well.

An exemplary order of secondary rays generated by the VTE 210 and placed into the outbox 1100 is illustrated in FIG. 11. As illustrated in FIG. 10 the first reflected secondary ray 1022 and the first refracted secondary ray 1032 have different trajectories, and, consequently, the workload manager 205 may traverse these rays to different portions of the spatial index. If a workload manager 205 was to traverse these rays in the order in which the VTE 210 generated them (i.e., the order illustrated in the outbox 1100—reflected ray then refracted ray), the different spatial index traversals may cause cache misses and require a workload manager 205 to fetch different spatial index data from memory. The fetching of new spatial index may increase the time necessary to traverse the secondary rays through the spatial index. However, as described with respect to method 900, the VTE 210 may reorder the rays located in the outbox 1100 in order to decrease the number of cache misses and reduce the time necessary to traverse the secondary rays through the spatial index.

FIG. 11 illustrates an exemplary reordered outbox 1100B. The order of the rays present in the reordered outbox 1100B may have been determined based on similarities between rays in the outbox. For example, the reflected rays (i.e., 1022, 1024, and 1026) all have a similar trajectory and originate from relatively similar locations within the three dimensional scene. Consequently, the VTE 210 reordered reflected secondary rays (i.e., 1022, 1024, and 1026) such that they are located relatively close to one another in the reordered outbox 1100B. Therefore, in the present example, a workload manager 205 traversing the secondary rays in the order depicted in outbox 1100B may traverse the reflected secondary rays one after another and before traversing any other secondary rays (e.g., refractive secondary rays having different trajectories and/or originating locations), thereby increasing the likelihood that the necessary spatial index information will be present in the workload manager 205 cache memory.

Furthermore, the refracted rays (i.e., 1032, 1034, and 1036) all have a similar trajectory and originate from relatively similar locations within the three dimensional scene. Consequently, the VTE 210 reordered the reflected secondary rays (i.e., 1032, 1034, and 1036) such that they are located relatively close to one another in the reordered outbox 1100B. Therefore, in the present example, a workload manager 205 traversing the secondary rays in the order depicted in outbox 1100B may traverse the refracted secondary rays one after another without traversing any intervening secondary rays (e.g., reflective secondary rays having different trajectories and/or originating location). Although the traversal of the first refracted secondary ray 1032 (which immediately follows the third (last) reflected secondary ray in the outbox 1100B) may cause cache misses, the traversal of the subsequent refracted secondary rays (i.e., 1034 and 1036) may not cause as many cache misses. The traversal of the subsequent refracted secondary rays may not experience as many cache misses because they have a similar trajectory and location, and thus may be traversed through the same portions of the spatial index. Thus, the new order of the outbox 1100B may reduce the number of cache misses experienced by the workload manager 205 which may reduce the amount of time necessary to traverse these secondary rays through the spatial index.

Although the aforementioned reordering was described as the VTE 210 pooling secondary rays and reordering them before sending the secondary rays to the workload manager 205, according to other embodiments of the invention, the VTE 210 may send the rays to a workload manager 205 without ordering the secondary rays. However, according to other embodiments of the invention, the workload manager 205 may reorder the secondary rays according to similarities in the rays before performing spatial index traversal. The workload manager 205 may reorder the secondary rays in a similar fashion as described above, with regards to the method 900. Therefore, a workload manager 205 may reorder secondary rays to reduce the time necessary to traverse secondary rays through the spatial index.

Conclusion

By reordering secondary rays before a traversing the secondary rays through a spatial index, a ray tracing image processing system performance may be improved. According to one embodiment of the invention, secondary rays may be reordered according to similarities which cause the rays to be traversed through the same or similar portions of a spatial index. Consequently, the information which defines the portion of the spatial index may still be in the cache of the workload manager performing the secondary-ray spatial index traversal. This may reduce the number of cache misses when traversing secondary rays through the spatial index, thereby reducing the amount of time necessary to traverse the secondary rays through the spatial index and improving the performance of a ray tracing image processing system.

While the foregoing is directed to embodiments of the present invention, other and further embodiments of the invention may be devised without departing from the basic scope thereof, and the scope thereof is determined by the claims that follow.

What is claimed is:
1. A method of performing ray tracing, comprising:
   generating a set of primary rays into a three-dimensional scene;
   pooling a first threshold count of secondary rays of the primary rays in a first order, wherein secondary rays are generated when the primary rays intersect objects within the three-dimensional scene;

determining whether the pooled secondary rays include at least a second threshold count of rays having a similar property, regardless of types of the secondary rays, wherein the property is selected from at least one of a secondary ray trajectory and a secondary ray originating location;

upon determining that the second threshold count is not met, traversing the pooled secondary rays through a spatial index according to the first order, wherein the spatial index has nodes representing bounding volumes in the three-dimensional scene; and upon determining that the second threshold count is met, traversing the pooled secondary rays through the spatial index according to a second order different from the first order, wherein the pooled secondary rays are reordered into the second order based on the similar property and by operation of one or more computer processors.

2. The method of claim 1, wherein:
the secondary rays are pooled in an outbox;
the first threshold is dependent on at least one of a size of the outbox and a likelihood that similar rays will be present in the outbox when the outbox is reordered.

3. The method of claim 1, wherein secondary rays comprise at least one of a reflected ray, a refracted ray, and a shadow ray.

4. The method of claim 1, wherein the pooled secondary rays are traversed through the spatial index according to the second order only upon determining that the secondary rays are not already ordered based on the similar property, and wherein the method further comprises:

upon determining that a count of secondary rays generated does not meet the first threshold count, generating one or more additional secondary rays based on the primary rays and the objects within the three-dimensional scene.

5. The method of claim 4, wherein the secondary rays are not pooled until the count of secondary rays generated meets the first threshold count.

6. The method of claim 5, wherein the secondary rays are pooled in an outbox, and wherein the first threshold count is determined from: (i) a size of the outbox and (ii) a likelihood that similar rays will be present in the outbox when the outbox is reordered.

7. The method of claim 6, wherein the nodes of the special index define bounding volumes which partition the three-dimensional scene, wherein the spatial index is selected from a k-dimensional tree (kd-tree), a binary space partitioning (BSP) tree, and an octree, wherein at least one node of the kd-tree further defines a single splitting plane for splitting a bounding volume in the three-dimensional scene.

8. The method of claim 7, wherein the at least one node of the kd-tree comprises an internal node containing: (i) information which indicates an axis along which the splitting plane is drawn; (ii) information which indicates a position of the splitting plane along the axis; and (iii) a pointer to a child node.

9. The method of claim 8, wherein the child node is selected from a second internal node and a leaf node, wherein the leaf node represents a bounding volume that is not further subdivided by any splitting plane defined by the kd-tree, wherein the leaf node comprises a pointer to at least one of the objects within the three-dimensional scene, wherein the pooled secondary rays are reordered into the second order to reduce a count of cache misses associated with traversing the pooled secondary rays, wherein the second threshold count is greater than one, and wherein the second threshold count is less than or equal to the first threshold count.

10. A computer readable storage medium containing a program which, when executed, performs an operation comprising:

generating a set of primary rays into a three-dimensional scene;

pooling a first threshold count of secondary rays of the primary rays in a first order, wherein the secondary rays are generated when the primary rays intersect objects within the three-dimensional scene;

determining whether the pooled secondary rays include at least a second threshold count of rays having a similar property, regardless of types of the secondary rays, wherein the property is selected from at least one of a secondary ray trajectory and a secondary ray originating location;

upon determining that the second threshold count is not met, traversing the pooled secondary rays through a spatial index according to the first order, wherein the spatial index has nodes representing bounding volumes in the three-dimensional scene;

upon determining that the second threshold count is met, reordering the secondary rays into at least a first group and a second group, based on the similar property; and sending the secondary rays in the first group together to a processing element for traversing the spatial index.

11. The computer readable storage medium of claim 10, wherein the operations further comprise:

traversing each of the rays in the first group through the spatial index before tracing the rays in the second group through the spatial index.

12. The computer readable storage medium of claim 10, wherein the secondary rays are pooled in an outbox, and wherein the first threshold is dependent on at least one of a size of the outbox and a likelihood that similar rays will be present in the outbox when the outbox is reordered.

13. The computer readable storage medium of claim 10, wherein secondary rays comprise at least one of a reflected ray, a refracted ray, and a shadow ray.

14. A system, comprising:
a first processing element configured to generate primary rays into a three-dimensional scene;
a second processing element configured to:
pool a first threshold count of secondary rays of the primary rays in a first order, wherein the secondary rays are generated when the primary rays intersect objects within the three-dimensional scene;

determining whether the pooled secondary rays include at least a second threshold count of rays having a similar property, regardless of types of the secondary rays, wherein the property is selected from at least one of a secondary ray trajectory and a secondary ray originating location;

upon determining that the second threshold count is not met, traversing the pooled secondary rays through a spatial index according to the first order, wherein the spatial index has nodes representing bounding volumes in the three-dimensional scene;

upon determining that the second threshold count is met, traversing the pooled secondary rays through the spatial index according to a second order different from the first order, wherein the pooled secondary rays are reordered into the second order based on the similar property; and send the secondary rays in the second order to the first processing element; and wherein the first processing element is further configured to traverse the secondary rays through the spatial index according to the second order.

15. The system of claim 14, further comprising:
an outbox coupled to the first processing element; and
wherein the rays are reordered upon determining that the count of the pooled secondary rays in the outbox meets the first threshold.

16. The system of claim 15, wherein the first threshold is dependent on at least one of a size of the outbox and a likelihood that similar rays will be present in the outbox when the outbox is reordered.

17. The system of claim 15, further comprising:
a memory cache coupled to the first processing element and the second processing element.

18. The system of claim 17, wherein the outbox is a portion of the memory cache.

19. The system of claim 14, wherein secondary rays comprise at least one of a reflected ray, a refracted ray, and a shadow ray.

* * * * *